(12) United States Patent
Suzuki

(10) Patent No.: US 8,238,676 B2
(45) Date of Patent: Aug. 7, 2012

(54) IMAGE DATA COMPRESSOR AND IMAGE DATA DECOMPRESSOR

(75) Inventor: Toshihiko Suzuki, Hamamatsu (JP)

(73) Assignee: Yamaha Corporation (JP)

( * ) Notice: Subject to any disclaimer, the term of this patent is extended or adjusted under 35 U.S.C. 154(b) by 868 days.

(21) Appl. No.: 12/334,225

(22) Filed: Dec. 12, 2008

(65) Prior Publication Data

US 2009/0154817 A1 Jun. 18, 2009

(30) Foreign Application Priority Data

Dec. 14, 2007 (JP) ................................ 2007-324020
Dec. 14, 2007 (JP) ................................ 2007-324023

(51) Int. Cl.
*G06K 9/36* (2006.01)
*G06K 9/46* (2006.01)

(52) U.S. Cl. ...................................................... 382/233

(58) Field of Classification Search .................. 382/164, 382/173, 232, 233, 238, 250, 251, 253; 375/240.01, 375/240.2, 240.14, 240.16, 240.17, 240.21, 375/240.25, E7.107, E7.119, E7.198, E7.211; 341/50, 67

See application file for complete search history.

(56) References Cited

U.S. PATENT DOCUMENTS

| | | | | |
|---|---|---|---|---|
| 5,440,345 | A | * | 8/1995 | Shimoda ................... 375/240.14 |
| 5,557,332 | A | * | 9/1996 | Koyanagi et al. ......... 375/240.16 |
| 5,680,266 | A | * | 10/1997 | Park ............................... 360/48 |
| 6,192,078 | B1 | * | 2/2001 | Komiya et al. ........... 375/240.16 |
| 6,501,863 | B1 | | 12/2002 | Fukuhara et al. |
| 6,697,431 | B1 | * | 2/2004 | Yoneyama ................ 375/240.16 |
| 7,974,345 | B2 | * | 7/2011 | Kondo et al. ............. 375/240.16 |
| 7,991,237 | B2 | * | 8/2011 | Sekiguchi et al. ............ 382/238 |
| 2001/0016010 | A1 | * | 8/2001 | Kim .......................... 375/240.25 |
| 2003/0072369 | A1 | | 4/2003 | Kypreos et al. |
| 2005/0201459 | A1 | * | 9/2005 | Hayashi ..................... 375/240.2 |
| 2006/0232452 | A1 | * | 10/2006 | Cha ................................. 341/50 |
| 2008/0260276 | A1 | | 10/2008 | Yamatani et al. |
| 2009/0154817 | A1 | * | 6/2009 | Suzuki ......................... 382/233 |

FOREIGN PATENT DOCUMENTS

| | | |
|---|---|---|
| JP | 11-112985 A | 4/1999 |
| JP | 2003-189306 A | 7/2003 |
| JP | 2004-320314 A | 11/2004 |
| WO | 2006/054667 A1 | 5/2006 |

OTHER PUBLICATIONS

Notification of Reasons for Rejection for corresponding JP 2007-324023, mail date Mar. 27, 2012. English translation provided.

* cited by examiner

*Primary Examiner* — Amir Alavi
(74) *Attorney, Agent, or Firm* — Rossi, Kimms & McDowell LLP

(57) ABSTRACT

In a data decompressor, a variable length decoding unit extracts a variable length code from compressed image data, performs variable length decoding of the extracted variable length code, and restores quantized data before the variable length encoding was applied. An inverse quantization unit performs inverse quantization on the restored quantized data to generate orthogonal transform coefficients of each block and writes the generated orthogonal transform coefficients to a memory. An inverse orthogonal transform unit reads the orthogonal transform coefficients of each block from the memory and performs an inverse transform of the orthogonal transform performed by a data compressor on the orthogonal transform coefficients to thereby restore an image of each block. The inverse orthogonal transform unit is constructed so as to perform the inverse transform of the orthogonal transform coefficients in parallel with the variable length decoding of the variable length decoding unit and the inverse quantization of the inverse quantization unit.

4 Claims, 14 Drawing Sheets

2×2 DCT

CORRECTION PROCESS

2×2 DCT

CORRECTION PROCESS

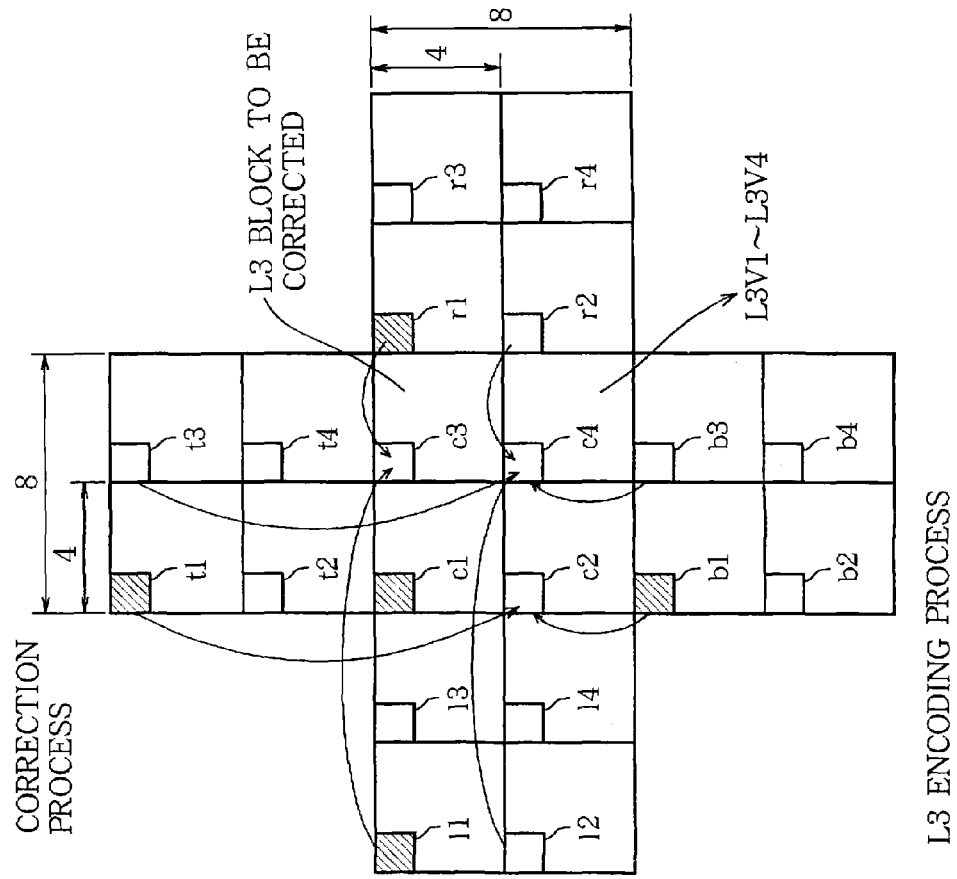
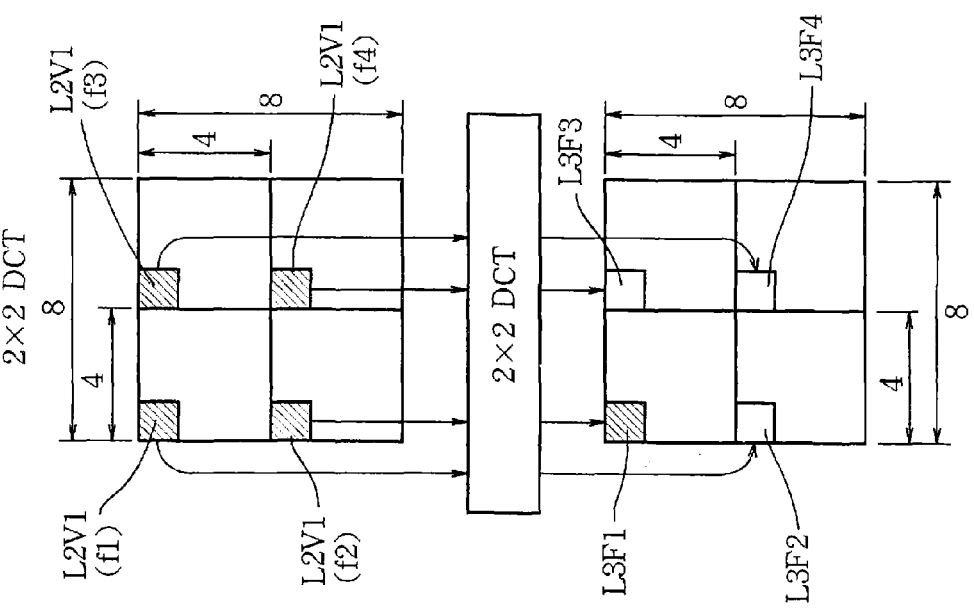

CORRECTION PROCESS

L2 DECODING PROCESS

2×2 IDCT

CORRECTION PROCESS

L1 DECODING PROCESS

2×2 IDCT

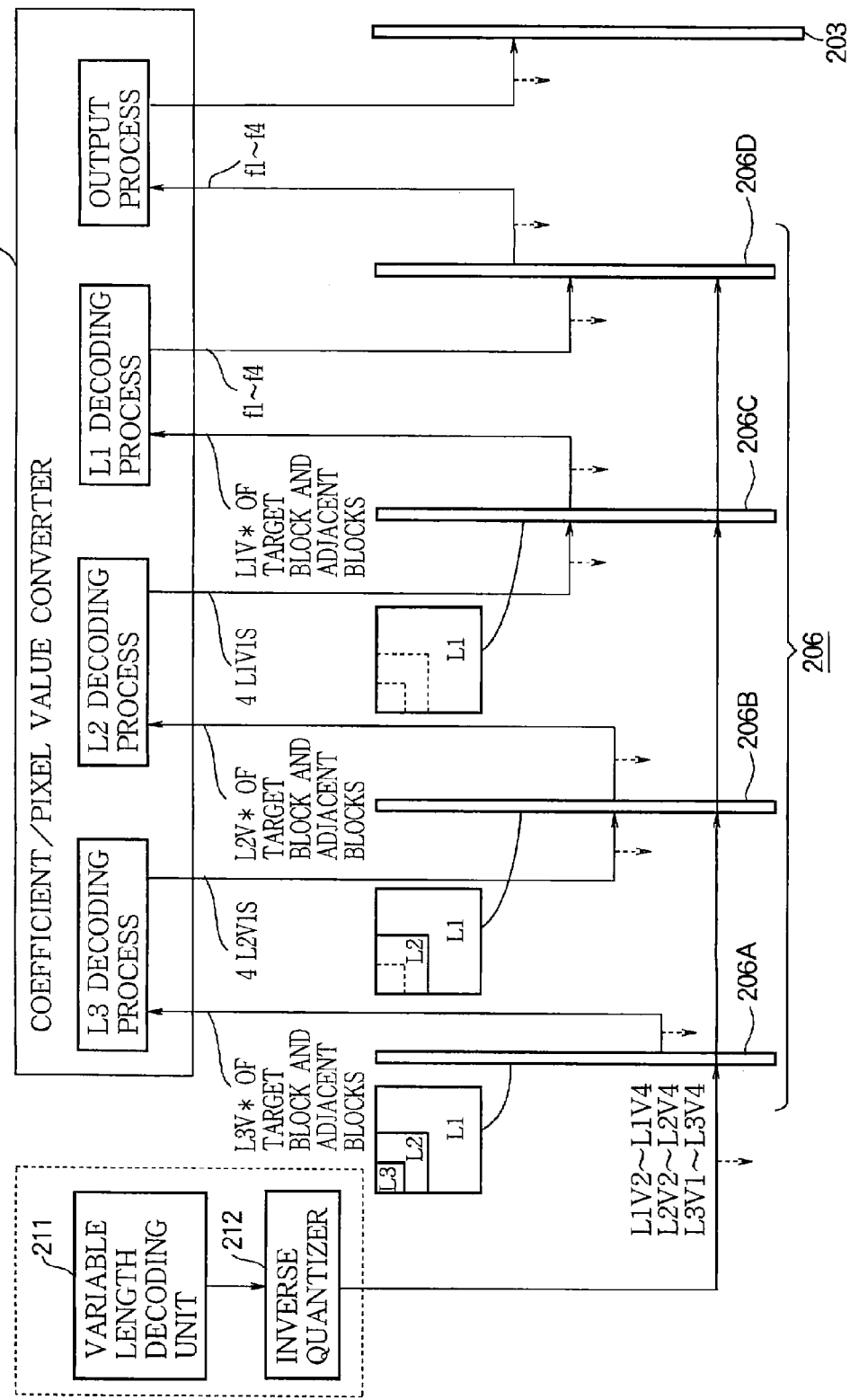

ADDRESS MAP

ADDRESS MAP (DETAILS)

| $ADR_{i,j,0}$ | $ADR_{i,j,4}$ | $ADR_{i,j,8}$ | $ADR_{i,j,12}$ |
|---|---|---|---|
| $ADR_{i,j,1}$ | $ADR_{i,j,5}$ | $ADR_{i,j,9}$ | $ADR_{i,j,13}$ |
| $ADR_{i,j,2}$ | $ADR_{i,j,6}$ | $ADR_{i,j,10}$ | $ADR_{i,j,14}$ |
| $ADR_{i,j,3}$ | $ADR_{i,j,7}$ | $ADR_{i,j,11}$ | $ADR_{i,j,15}$ |

NOT REORDERED

| ○ | | △ | | ○ | | △ | |
|---|---|---|---|---|---|---|---|
| 1 | 9 | 17 | 25 | 33 | 41 | 49 | 57 |
| 2 | 10 | 18 | 26 | 34 | 42 | 50 | 58 |
| △ | | △ | | △ | | △ | |
| 3 | 11 | 19 | 27 | 35 | 43 | 51 | 59 |
| 4 | 12 | 20 | 28 | 36 | 44 | 52 | 60 |
| ○ | | △ | | ○ | | △ | |
| 5 | 13 | 21 | 29 | 37 | 45 | 53 | 61 |
| 6 | 14 | 22 | 30 | 38 | 46 | 54 | 62 |
| △ | | △ | | △ | | △ | |
| 7 | 15 | 23 | 31 | 39 | 47 | 55 | 63 |
| 8 | 16 | 24 | 32 | 40 | 48 | 56 | 64 |

REORDERED

| ○ | ○ | △ | △ | | | | |
|---|---|---|---|---|---|---|---|
| 1 | 33 | 17 | 49 | 9 | 25 | 41 | 57 |
| ○ | ○ | △ | △ | | | | |
| 5 | 37 | 21 | 53 | 11 | 27 | 43 | 59 |
| △ | △ | △ | △ | | | | |
| 3 | 35 | 19 | 51 | 13 | 29 | 45 | 61 |
| △ | △ | △ | △ | | | | |
| 7 | 39 | 23 | 55 | 15 | 31 | 47 | 63 |
| 2 | 18 | 34 | 50 | 10 | 26 | 42 | 58 |
| 4 | 20 | 36 | 52 | 12 | 28 | 44 | 60 |
| 6 | 22 | 38 | 54 | 14 | 30 | 46 | 62 |
| 8 | 24 | 40 | 56 | 16 | 32 | 48 | 64 |

○ : L3 DCT COEFFICIENTS L3V1~L3V4
△ : L2 DCT COEFFICIENTS L2V2~L2V4
NO SYMBOL : L1 DCT COEFFICIENTS L1V2~L1V4

FIG.10a  THE NUMBER OF ACCESSES TO
MEMORY IN L3 DECODING PROCESS
NOT REORDERED
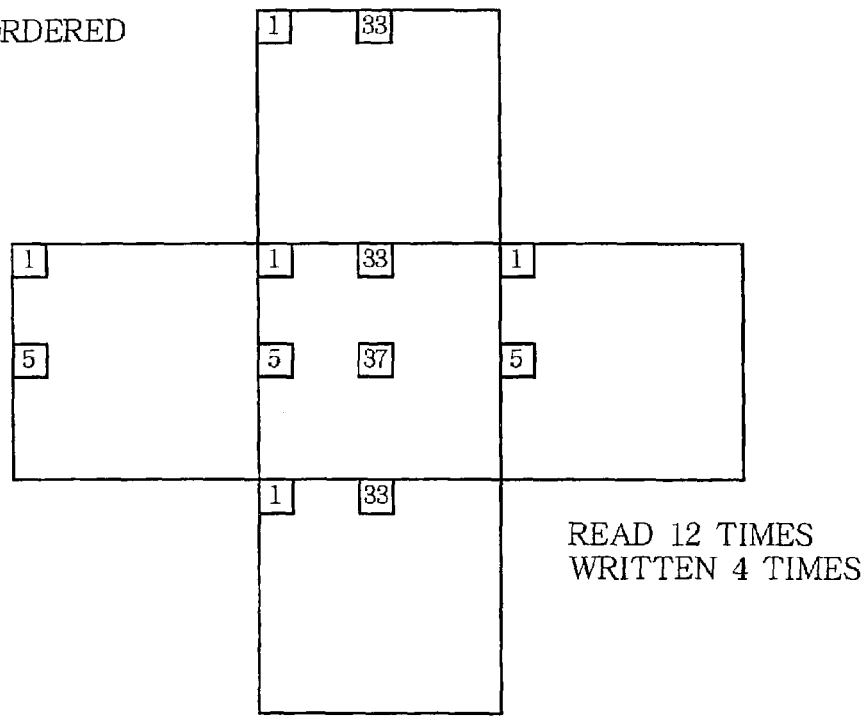
READ 12 TIMES
WRITTEN 4 TIMES
FIG.10b
REORDERED
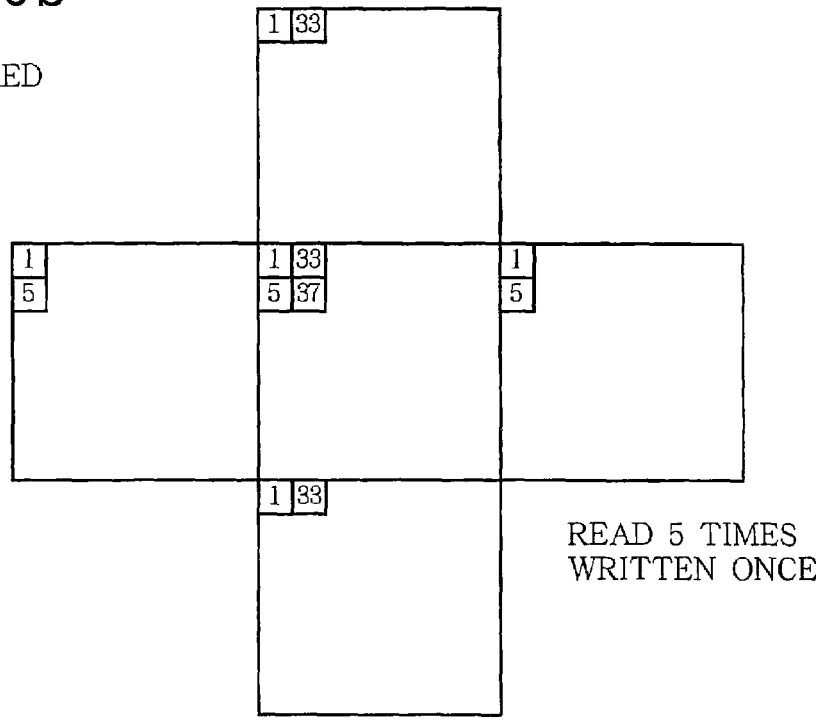
READ 5 TIMES
WRITTEN ONCE FIG.11a   THE NUMBER OF ACCESSES TO MEMORY IN L2 DECODING PROCESS
NOT REORDERED
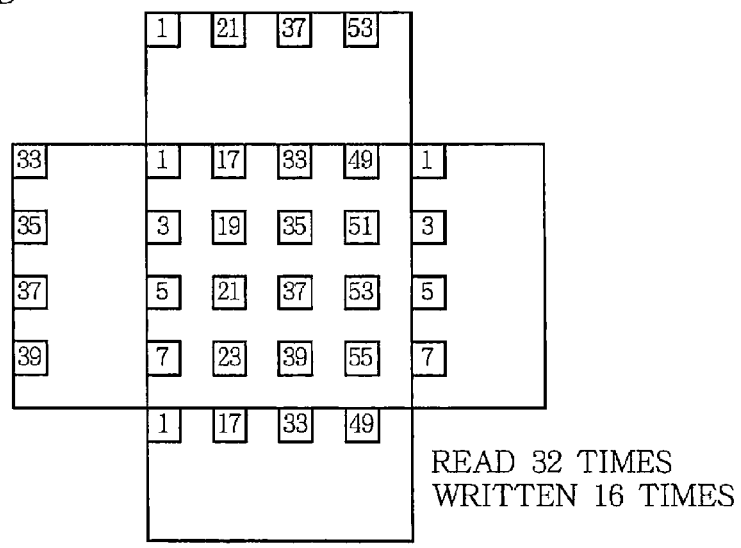
READ 32 TIMES
WRITTEN 16 TIMES
FIG.11b
REORDERED
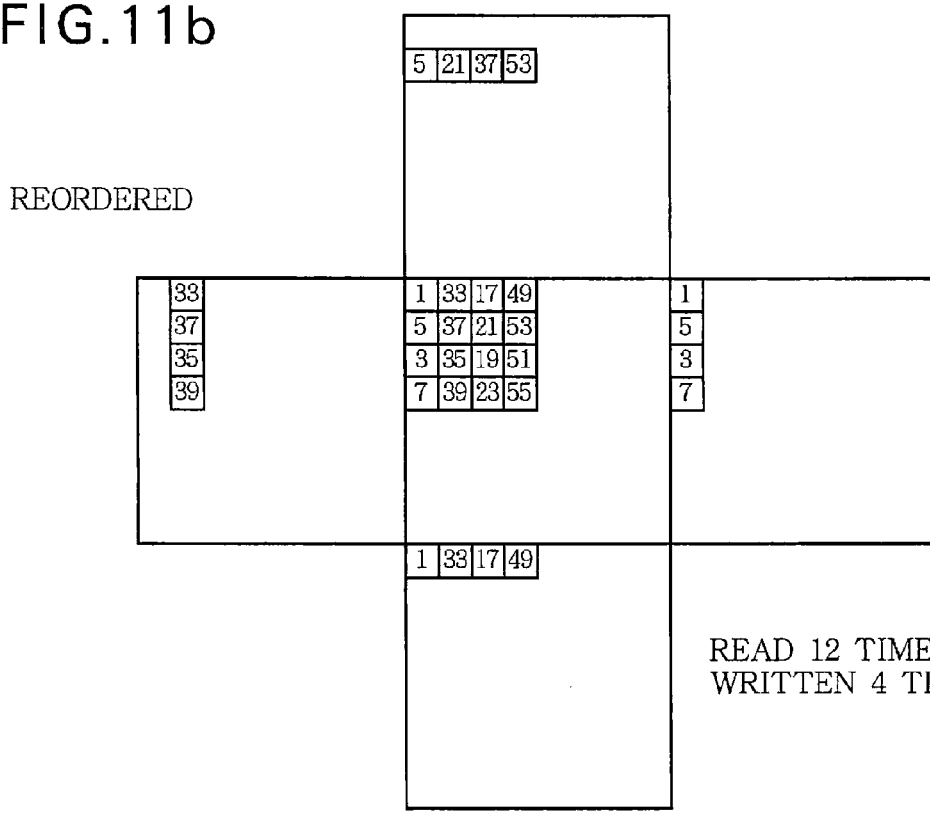
READ 12 TIMES
WRITTEN 4 TIMES

THE NUMBER OF ACCESSES TO MEMORY IN
L1 DECODING PROCESS

NOT REORDERED

REORDERED

FIG.14

|   |   |   |   |   |   |   |   |
|---|---|---|---|---|---|---|---|
| ○ 1 | △ 17 | ○ 33 | △ 49 | 9 | 25 | 41 | 57 |
| △ 3 | △ 19 | △ 35 | △ 51 | 11 | 27 | 43 | 59 |
| ○ 5 | △ 21 | ○ 37 | △ 53 | 13 | 29 | 45 | 61 |
| △ 7 | △ 23 | △ 39 | △ 55 | 15 | 31 | 47 | 63 |
| 2 | 18 | 34 | 50 | 10 | 26 | 42 | 58 |
| 4 | 20 | 36 | 52 | 12 | 28 | 44 | 60 |
| 6 | 22 | 38 | 54 | 14 | 30 | 46 | 62 |
| 8 | 24 | 40 | 56 | 16 | 32 | 48 | 64 |

ADR<sub>i,j,0</sub> — top-left quadrant
ADR<sub>i,j,2</sub> — top-right quadrant
ADR<sub>i,j,1</sub> — bottom-left quadrant
ADR<sub>i,j,3</sub> — bottom-right quadrant

○ : L3 DATA
△ : L2 DATA
NO SYMBOL : L1 DATA

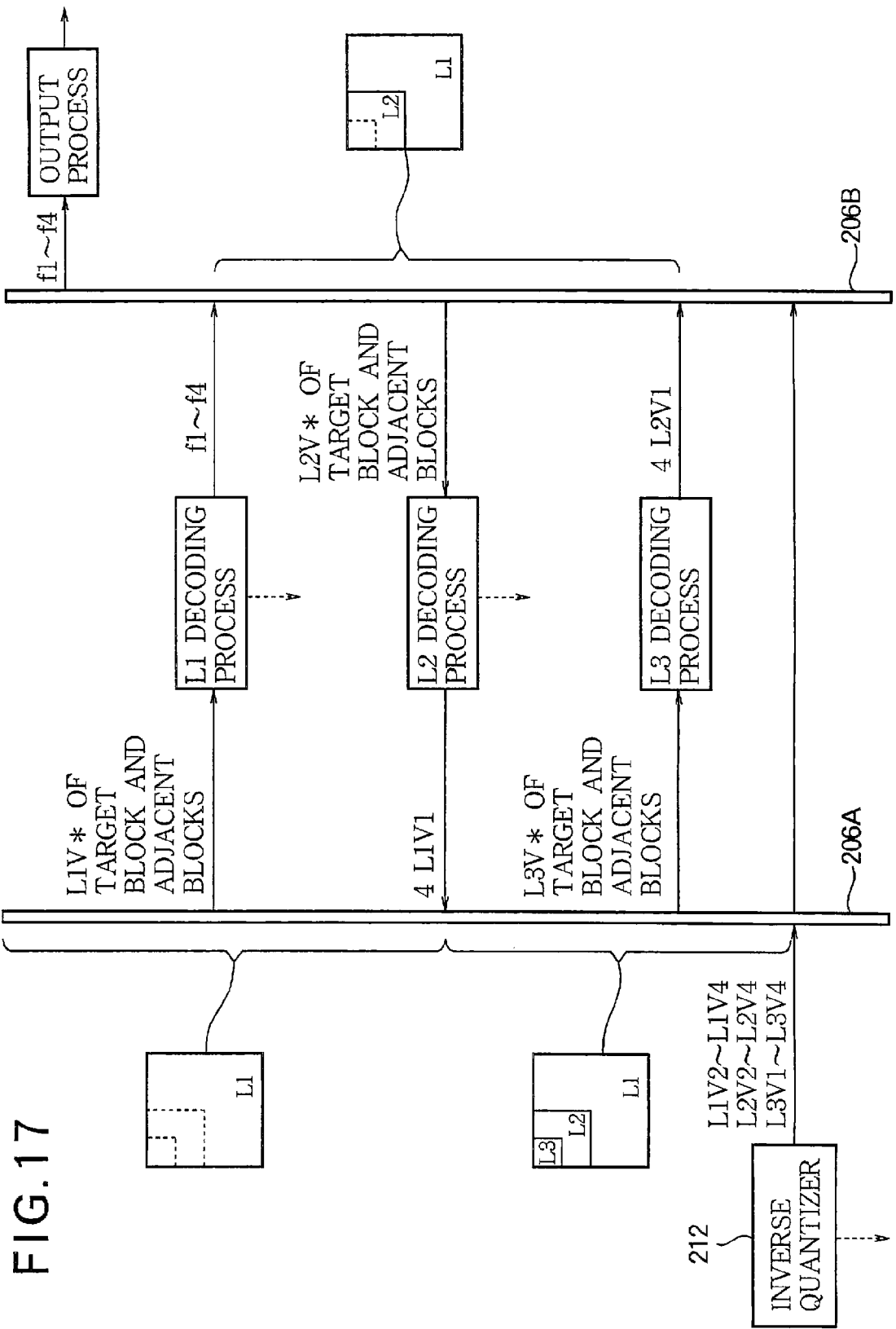

IMAGE DATA COMPRESSOR AND IMAGE DATA DECOMPRESSOR

BACKGROUND OF THE INVENTION

1. Technical Field of the Invention

The present invention relates to a data compressor that performs a compression process on image data of a still image and a data decompressor that performs a decompression process on compressed image data of a still image.

2. Description of the Related Art

One known data compressor, which performs a compression process on a still image according to the Joint Photographic Experts Group (JPEG), uses Discrete Cosine Transform (DCT) which is a type of orthogonal transform. The data compressor divides an image to be compressed into blocks of a predetermined pixel size, performs DCT on pixel values of each block, and performs a quantization process and a variable length coding process on DCT coefficients of each block obtained through DCT to generate compressed image data of the still image. A data decompressor, which performs a decompression process on such compressed image data, extracts a variable length code from compressed image data, performs variable length decoding and inverse quantization processes, and then performs Inverse Discrete Cosine Transform (IDCT) on DCT coefficients of each block obtained through the processes to restore the original still image.

However, the conventional data decompressor described above stores DCT coefficients, which have been subjected to variable length decoding and inverse quantization processes, in a memory, and activates IDCT of each block after waiting until DCT coefficients of all blocks of the still image are stored in the memory. Therefore, for example, when the conventional data decompressor reads compressed image data from an external storage medium having a low read speed and performs variable length decoding and inverse quantization on the read compressed image data, activation of IDCT of each block is delayed, thereby increasing the time required until restoration of the still image is activated.

One known algorithm for compressing a still image according to the Joint Photographic Experts Group (JPEG) uses Discrete Cosine Transform (DCT). The compression algorithm divides an image to be compressed into blocks of a predetermined pixel size, performs DCT on pixel values of each block, and performs a quantization process and a variable length coding process on DCT coefficients of each block obtained through DCT to generate compressed image data of the still image. This compression algorithm can perform data compression with high efficiency. However, since this compression algorithm performs DCT of pixel values of each block, independently of each other, to generate compressed image data, the compression algorithm has a problem in that, when the compressed image data is decompressed to restore the still image, block distortion easily occurs such that gray levels of pixels are discontinuous and look awkward at boundaries of blocks.

Patent Reference 1 (Pamphlet of International Patent Application Publication No. 2006/054667) discloses an image compression/decompression technology for solving this problem. In the technology disclosed in Patent Reference 1, compression and decompression of image data of a still image is performed in the following manner.

a. When image data is compressed, an image is divided into blocks of a predetermined pixel size, DCT is performed on pixel values for each block to generate DCT coefficients, DCT coefficients of a slope cancellation function having a slope identical to that of an envelope line of pixel values at boundaries of the block are obtained, the DCT coefficients of the slope cancellation function are subtracted from the DCT coefficients obtained from the pixel values of the block, and quantization and variable length coding processes are performed on the DCT coefficients, from which the DCT coefficients of the slope cancellation function have been subtracted, to generate compressed image data. Here, the DCT coefficients of the slope cancellation function of each block are calculated with reference to DCT coefficients of pixel values of adjacent blocks at top, bottom, left, and right sides of the block.

b. When compressed image data is decompressed, variable length decoding and inverse quantization processes are performed on the compressed image data to restore DCT coefficients of each block, and DCT coefficients of each block before the slope cancellation function is subtracted from the block are restored with reference to DCT coefficients of each adjacent block at top, bottom, left, and right sides of the block, Inverse Discrete Cosine Transform (IDCT) is performed on the restored DCT coefficients to restore pixel values.

In the technology disclosed in Patent Reference 1 described above, DCT coefficients of each block previously stored in a memory such as RAM are referred to in order to restore pixel values of one block when compressed image data is decompressed. Here, it is necessary to refer not only to DCT coefficients of the block to be processed but also to DCT coefficients of adjacent blocks at the top, bottom, left, and right sides of the block. This causes a problem in that the number of times the memory is accessed per block is great, thereby increasing the time required to perform the decompression process.

SUMMARY OF THE INVENTION

The present invention has been made in view of the above circumstances, and it is an object of the present invention to provide a technical means that enables an efficient process for decompressing compressed image data and reduces the time required until restoration of a still image is activated.

It is another object of the present invention to provide a data decompressor that requires a small number of accesses to a memory in which DCT coefficients are stored and can efficiently perform a decompression process.

In accordance with a first aspect of the invention, there is provided a data decompressor that performs a decompression process on compressed image data including a variable length code generated by a data compressor, the data compressor including an orthogonal transform unit for dividing an image to be compressed into blocks of a predetermined pixel size, performing an orthogonal transform on each of the blocks, and outputting orthogonal transform coefficients representing a result of the orthogonal transform, a quantization unit for quantizing the orthogonal transform coefficients and outputting quantized data, and a variable length encoding unit for performing variable length encoding on the quantized data and outputting the variable length code, the data decompressor comprising: a memory; a variable length decoding unit that extracts the variable length code from the compressed image data, performs variable length decoding of the extracted variable length code, and restores the quantized data before the variable length encoding was applied; an inverse quantization unit that performs inverse quantization on the restored quantized data to generate the orthogonal transform coefficients of each block and writes the generated orthogonal transform coefficients to the memory; and an inverse orthogonal transform unit that reads the orthogonal transform coefficients of each block from the memory and performs an inverse transform of the orthogonal transform performed by the orthogonal transform unit on the orthogonal transform coefficients to thereby restore an image of each block, wherein the inverse orthogonal transform unit is constructed so as to perform the inverse transform of the orthogonal transform coefficients in parallel with the variable length decoding of the variable length decoding unit and the inverse quantization of the inverse quantization unit.

According to this data decompressor, since the inverse orthogonal transform unit performs inverse transform in parallel with both variable length decoding of the variable length decoding unit and inverse quantization of the inverse quantizer, it is possible to accelerate activation of the inverse transform and to reduce the time required until restoration of the still image is activated.

However, if DCT of pixel values of each block is performed independently of each other to generate compressed image data as described above, block distortion easily occurs, when the compressed image data is decompressed to restore the still image, such that gray levels of pixels are discontinuous and look awkward at boundaries of blocks.

Patent Reference 1 discloses an image compression/decompression technology for solving this problem. In the technology disclosed in Patent Reference 1, compression and decompression of image data of a still image is performed in the following manner.

a. When image data is compressed, an image is divided into blocks of a predetermined pixel size, DCT is performed on pixel values for each block to generate DCT coefficients, DCT coefficients of a slope cancellation function having a slope identical to that of an envelope line of pixel values at boundaries of the block are obtained, the DCT coefficients of the slope cancellation function are subtracted from the DCT coefficients obtained from the pixel values of the block, and quantization and variable length coding processes are performed on the DCT coefficients, from which the DCT coefficients of the slope cancellation function have been subtracted, to generate compressed image data. Here, the DCT coefficients of the slope cancellation function of each block are calculated with reference to DCT coefficients of pixel values of adjacent blocks at top, bottom, left, and right sides of the block.

b. When the compressed image data is decompressed, variable length decoding and inverse quantization processes are performed on the compressed image data to restore DCT coefficients of each block, and DCT coefficients of each block before the slope cancellation function is subtracted from the block are restored with reference to DCT coefficients of each adjacent block at top, bottom, left, and right sides of the block, Inverse Discrete Cosine Transform (IDCT) is performed on the restored DCT coefficients to restore pixel values.

A second aspect of the invention relates to a data compression/decompression technology that has evolved from the technology described in Patent Reference 1. A data decompressor according to the second aspect of the invention performs a decompression process on compressed image data obtained through a compression algorithm as follows.

a. The compression algorithm sequentially performs encoding processes of a plurality of layers on an image to be compressed.

b. The compression algorithm divides the image to be compressed into blocks of a predetermined pixel size and performs DCT on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block.

c. In an encoding process of each upper layer above the lowermost layer, the compression algorithm constructs blocks of the upper layer, each including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer.

d. The compression algorithm generates compressed image data representing Discrete Cosine Transform (DCT) coefficients of blocks of each layer obtained through the encoding process of each layer.

The data decompressor according to the second aspect comprises: a memory; a write unit that sequentially extracts DCT coefficients of a block of an uppermost layer and a block of each layer belonging to the block of the uppermost layer from the compressed image data, and writes the extracted DCT coefficients to the memory; and a coefficient/pixel value converter. The coefficient/pixel value converter performs the following processes.

a. The coefficient/pixel value converter sequentially performs a decoding process of each layer, from the uppermost layer to the lowermost layer, using DCT coefficients obtained as a result of the encoding process of each layer represented by the compressed image data, and calculates the pixel values of the image before compression.

b. In the decoding process of each layer other than the lowermost layer, the coefficient/pixel value converter performs a correction process on each block of each layer by adding DCT coefficients of a slope cancellation function of the block to DCT coefficients of the block with reference to DCT coefficients of the layer of adjacent blocks at top, bottom, left, and right sides of the block previously stored in the memory, and performs inverse DCT on the DCT coefficients of the block that has been subjected to the correction process to calculate DCT coefficients of DC component of each of a plurality of blocks of a lower layer below the layer into which the block of the layer has been divided, and writes the DCT coefficients of DC component of the block of the lower layer to the memory.

c. In the decoding process of the lowermost layer, the coefficient/pixel value converter performs a correction process on each block of the lowermost layer by adding DCT coefficients of a slope cancellation function of the block to DCT coefficients of the block with reference to DCT coefficients of the lowermost layer of adjacent blocks at top, bottom, left, and right sides of the block previously stored in the memory, and performs inverse DCT on the DCT coefficients of the block that has been subjected to the correction process to calculate pixel values of the block of the lowermost layer and writes the pixel values of the block of the lowermost layer to the memory.

The data decompressor according to the second aspect of the invention is characterized in that the coefficient/pixel value converter performs the decoding process of each layer in parallel by setting a phase difference of the decoding process between a lower layer and an upper layer that the decoding process of the lower layer is performed using required DCT coefficients after the DCT coefficients required by the decoding process of the lower layer are written to the memory through the decoding process of the upper layer.

This data decompressor can reduce the time required until restoration of a still image is activated since a decoding process of a lower layer is activated without waiting until all processes of an upper layer are completed.

In accordance with a third aspect of the invention, there is provided a data compressor that can increase the efficiency of the decompression process of the data decompressor according to the second aspect.

When an arrangement of N rows and M columns (N>1 and M>1) of blocks of the uppermost layer is obtained from a still image, an output unit of the data compressor repeats an operation for selecting N0 blocks of the uppermost layer belonging to the same column while sequentially shifting the column for blocks of the uppermost layer of first N0 rows and M columns (N0<N and N0<M), and outputs data corresponding to each block of the uppermost layer of the N0 rows and the M columns in compressed image data in an order by which each block is selected, and then repeats an operation for selecting M blocks of the uppermost layer belonging to the same row while sequentially shifting the row for remaining blocks of the uppermost layer of N-N0 rows and M columns, and outputs data corresponding to each block of the uppermost layer of N-N0 rows and M columns in the compressed image data in an order by which each block is selected.

Alternatively, when a still image is divided into an arrangement of blocks of the uppermost layer, the output unit selects one of blocks of 4 corners in the arrangement of blocks and repeats an operation for selecting each block of an L-shaped block sequence surrounding a range of the selected block, and, after the L-shaped block sequence including a last row or column has been selected, the output unit sequentially selects each block of each remaining row or column and outputs data corresponding to each block of the uppermost layer in the compressed image data in an order by which each block is selected.

When compressed image data output in this manner is provided to the data decompressor, the data decompressor can further reduce the time required until restoration of the still image is activated since DCT coefficients of adjacent blocks required for the decoding process of the uppermost layer are stored in the memory and blocks of the uppermost layer on which the decoding process of the uppermost layer can be performed can be generated early.

A data decompressor according to a fourth aspect of the invention performs a decompression process on compressed image data obtained through a compression algorithm as follows.

a. The compression algorithm sequentially performs encoding processes of a plurality of layers on an image to be compressed.

b. The compression algorithm divides the image to be compressed into blocks of a predetermined pixel size and performs DCT on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block.

c. In an encoding process of each upper layer above the lowermost layer, the compression algorithm constructs blocks of the upper layer, each including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer.

d. The compression algorithm generates compressed image data representing Discrete Cosine Transform (DCT) coefficients of blocks of each layer obtained through the encoding process of each layer.

The data decompressor according to the fourth aspect of the invention includes a memory and a coefficient/pixel value converter. The memory has a plurality of areas such that data can be read from or written to the memory in units of areas, each of the areas having a capacity capable of storing a plurality of DCT coefficients or a plurality of pixel values. The coefficient/pixel value converter performs the following processes.

e. The coefficient/pixel value converter sequentially performs a decoding process of each layer from an uppermost layer to the lowermost layer using DCT coefficients obtained as a result of the encoding process of each layer represented by the compressed image data, and calculates pixel values of an image before the compression, f. In the decoding process of each layer other than the lowermost layer, the coefficient/pixel value converter performs a correction process on each block of the layer by adding DCT coefficients of a slope cancellation function of the block to DCT coefficients of the block with reference to DCT coefficients of the layer of adjacent blocks at top, bottom, left, and right sides of the block previously stored in the memory, and performs inverse DCT on the DCT coefficients of the block that has been subjected to the correction process to calculate DCT coefficients of DC component of each of a plurality of blocks of a lower layer below the layer into which the block of the layer has been divided and writes the DCT coefficients of DC component of the block of the lower layer to the memory, g. In the decoding process of the lowermost layer, the coefficient/pixel value converter performs a correction process on each block of the lowermost layer by adding DCT coefficients of a slope cancellation function of the block to the DCT coefficients of the block with reference to DCT coefficients of the lowermost layer of adjacent blocks at top, bottom, left, and right sides of the block previously stored in the memory, and performs inverse DCT on the DCT coefficients of the block that has been subjected to the correction process to calculate pixel values of the block of the lowermost layer and writes the pixel values of the block of the lowermost layer to the memory, The data decompressor according to the fourth aspect of the invention is characterized by the following features. The compressed image data includes DCT coefficients of blocks of each layer belonging to each block of an uppermost layer. The data decompressor further comprises a reordering unit that reorders DCT coefficients of a block of the uppermost layer and blocks of each layer belonging to the block of the uppermost layer extracted from the compressed image data so that DCT coefficients of each layer are arranged in order of the layer and DCT coefficients to be stored in the same area are sequentially arranged, the reordering unit being located upstream of the coefficient/pixel value converter, and collectively stores DCT coefficients of each layer on a layer by layer basis in each area of the memory such that the number of areas in which the DCT coefficients of the layer are stored decreases as the hierarchal level of the layer increases.

According to the fourth aspect of the invention, in a decoding process of each layer, DCT coefficients of the same layer are read from the memory and DCT coefficients of the same layer are written to the memory. Accordingly, the data decompressor can reduce the number of accesses to the memory during decoding processes, thereby achieving an efficient decompression process since DCT coefficients or pixel values of each layer are collectively stored in each area of the memory.

BRIEF DESCRIPTION OF THE DRAWINGS

FIGS. 4a and 4b illustrate details of an L3 encoding process performed by the pixel value/coefficient converter.

FIG. 8 illustrates details of processes performed by a variable length decoding unit, an inverse quantizer, and the coefficient/pixe value converter of the data decompressor.

FIGS. 10a and 10b illustrate how the memory unit is accessed in the L3 decoding process.

FIGS. 11a and 11b illustrate how the memory unit is accessed in the L2 decoding process.

FIG. 14 illustrates another example of storage states of DCT coefficients in the memory unit in the embodiment.

FIG. 17 illustrates details of processes performed by the coefficient/pixe value converter in another embodiment of the invention.

DETAILED DESCRIPTION OF THE INVENTION

The embodiments of the invention will now be described with reference to the drawings.

Figure 1:
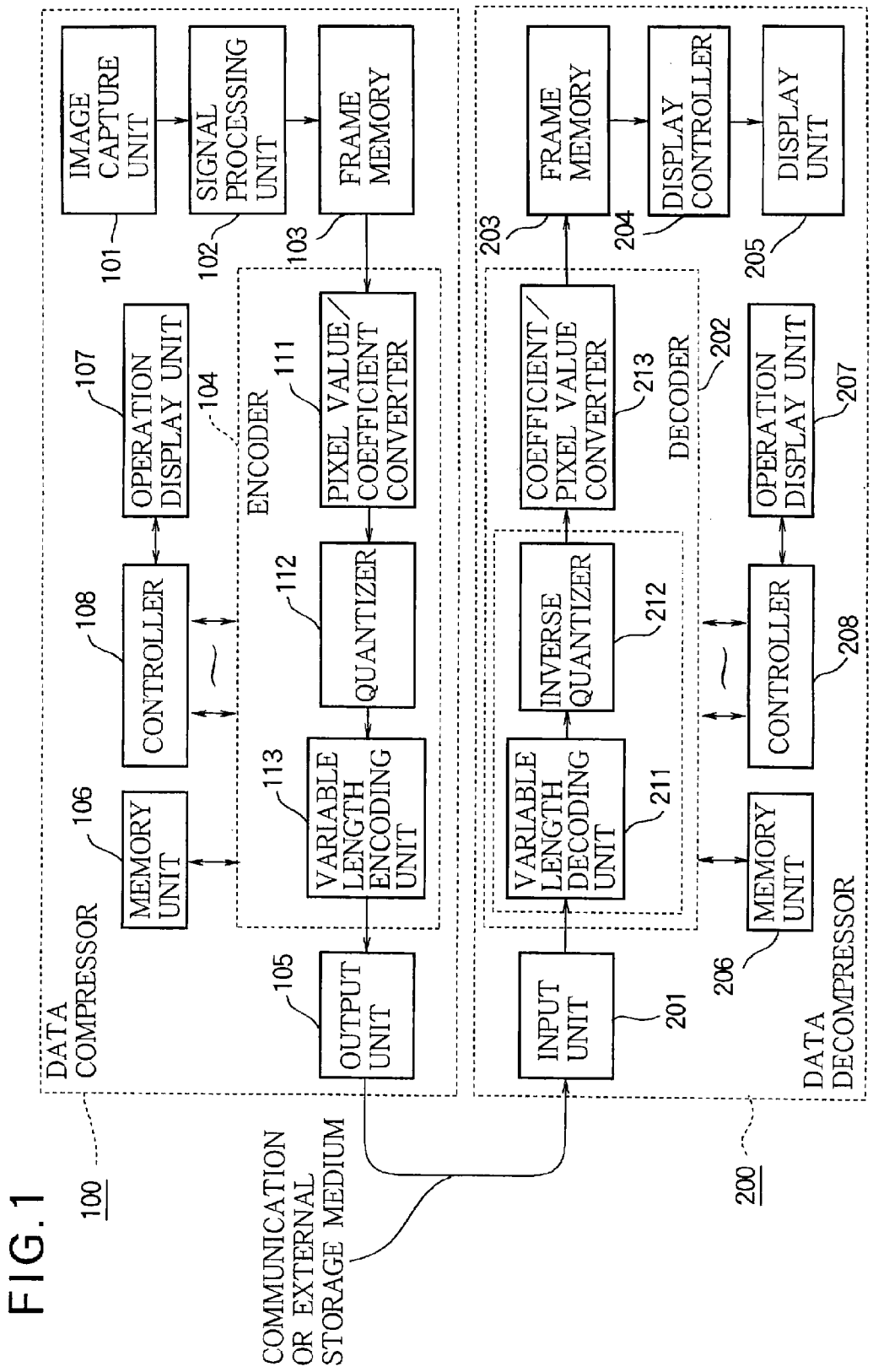
FIG. 1 is a block diagram illustrating the configuration of an image compression/transmission system including a data decompressor according to an embodiment of the invention.

FIG. 1 is a block diagram illustrating the configuration of an image compression/transmission system including a data decompressor 200 according to an embodiment of the invention. In the image compression/transmission system, the data compressor 100 is a device that compresses image data of a still image and outputs compressed image data. The data decompressor 200 according to this embodiment performs a decompression process on compressed image data output by the data compressor 100.

The data compressor 100 includes an image capture unit 101, a signal processing unit 102, a frame memory 103, an encoder 104, an output unit 105, a memory unit 106, an operation display unit 107, and a controller 108.

Here, the image capture unit 101 is a device such as a camera or scanner that captures a still image to be compressed and outputs an image signal. The frame memory 103 is, for example, RAM and serves to store image data of a still image to be compressed. The signal processing unit 102 performs A/D conversion on an image signal output from the image capture unit 101 to generate image data which is a combination of respective pixel values of pixels of a still image corresponding to one screen and stores the generated image data. Here, the pixel values of pixels represent the gray levels of the pixels. The encoder 104 is a device that performs a compression process on the image data stored in the frame memory 103 and outputs compressed image data. Details of the encoder 104 will be described later. The memory unit 106 is, for example, RAM and is used as a work area when the encoder 104 performs a compression process. The output unit 105 is a device that outputs the compressed image data received from the encoder 104. In an embodiment, the output unit 105 is a communication device that transmits a compressed image data file to another device through a network such as the Internet. In another embodiment, the output unit 105 is a device that writes compressed image data to an external storage medium such as an IC memory or a magnetic disk. The operation display unit 107 includes a display such as a liquid crystal display panel that displays guide information prompting a user to input a command or a control parameter and operators such as push buttons that the user operates to input a command or a control parameter. The controller 108 receives a variety of commands or control parameters through the operation display unit 107 and controls the overall operation of the data compressor 100.

The following is a description of the encoder 104. As shown, the encoder 104 includes a pixel value/coefficient converter 111, a quantizer 112, and a variable length encoding unit 113. The pixel value/coefficient converter 111 is a device that divides image data to be processed in the frame memory 103 into pixel value blocks of a predetermined pixel size (e.g., 8×8 pixels) and performs a compression process on the image data on a block by block basis. Here, the pixel value/coefficient converter 111 performs the compression process on the image data according to a Hierarchical Poly-Harmonic Local Cosine Transform (HPHLCT) algorithm that is an evolved version of a Poly-Harmonic Local Cosine Transform (PHLCT) algorithm described in Patent Reference 1. The pixel value/coefficient converter 111 is a kind of an orthogonal transform unit for dividing an image to be compressed into blocks of a predetermined pixel size, performing an orthogonal transform such as HPHLCT or PHLCT on each of the blocks, and outputting orthogonal transform coefficients representing a result of the orthogonal transform.

Figure 2A:
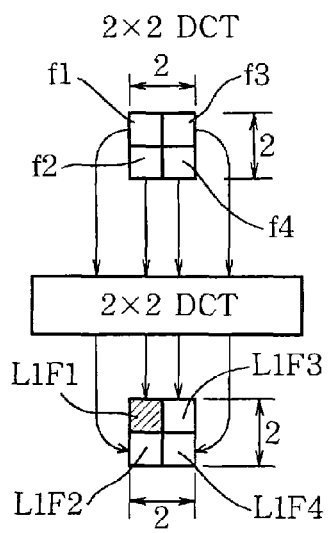
FIGS. 2a and 2b illustrate details of an L1 encoding process performed by a pixel value/coefficient converter of a data compressor in the image compression/transmission system.
Figure 2B:
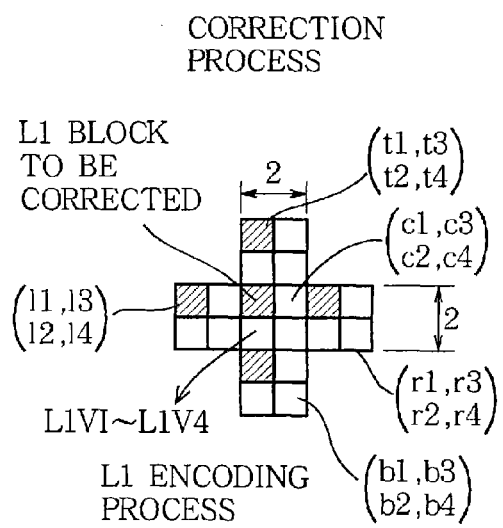
Figure 3A:
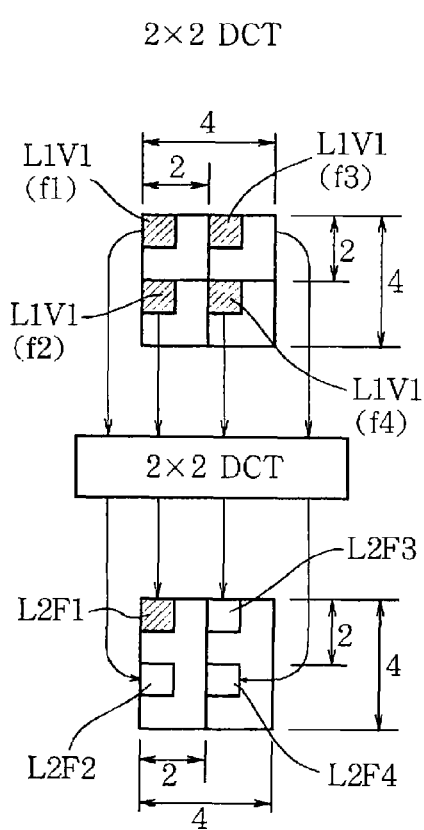
FIGS. 3a and 3b illustrate details of an L2 encoding process performed by the pixel value/coefficient converter.
Figure 3B:
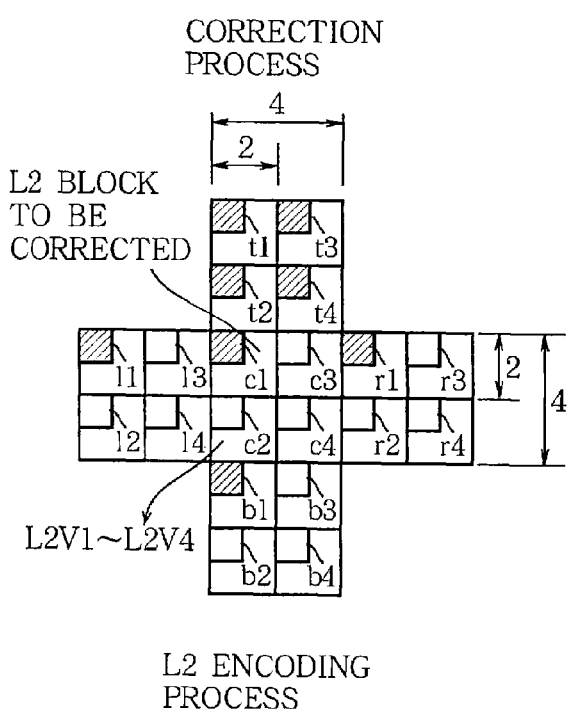

More specifically, the pixel value/coefficient converter 111 performs the compression process according to the HPHLCT algorithm by sequentially performing a Layer 1 (L1) encoding process, an L2 encoding process, and an L3 encoding process which have a hierarchical relationship. FIGS. 2a and 2b illustrate details of the L1 encoding process, FIGS. 3a and 3b illustrate details of the L2 encoding process, and FIGS. 4a and 4b illustrate details of the L3 encoding process. Each of the L1 to L3 encoding processes includes 2×2 DCT illustrated in FIG. 2a, FIG. 3a, and FIG. 4a and a correction process illustrated in FIG. 2b, FIG. 3b, and FIG. 4b.

In the L1 encoding process, the pixel value/coefficient converter 111 divides pixel values of a still image to be compressed into L1 blocks, each including 2×2 pixels, and performs 2×2 DCT on each L1 block to generate one DC DCT coefficient (DTC coefficient of DC component) L1F1 and three AC DCT coefficients (DTC coefficients of AC components) L1F2, L1F3, and L1F4.

Specifically, when "f1" denotes a pixel value of the first row and the first column of the L1 block, "f2" denotes a pixel value of the second row and the first column, "f3" denotes a pixel value of the first row and the second column, and "f4" denotes a pixel value of the second row and the second column, four DCT coefficients F1, F2, F3, and F4 are obtained according to the following equations.

$$F1=((f1+f3)+(f2+f4))/2 \quad (1)$$

$$F2=((f1+f3)-(f2+f4))/2 \quad (2)$$

$$F3=((f1-f3)+(f2-f4))/2 \quad (3)$$

$$F4=((f1-f3)-(f2-f4))/2 \quad (4)$$

In FIG. 2a, the DC DCT coefficient L1F1 of the first row and the first column among the matrix of DCT coefficients obtained through the 2×2 DCT process represents the DCT coefficient F1, the AC DCT coefficient L1F2 of the second row and the first column represents the DCT coefficient F2, the AC DCT coefficient L1F3 of the first row and the second column represents the DCT coefficient F3, and the AC DCT coefficient L1F4 of the second row and the second column represents the DCT coefficient F4.

Then, in the correction process, the pixel value/coefficient converter 111 subtracts, for each L1 block for which the DCT coefficients F1 to F4 have been obtained, DCT coefficients U1 to U4 of a slope cancellation function u(x,y) respectively from the DCT coefficients F1 to F4 to obtain DCT coefficients L1V1, L1V2, L1V3, and L1V4. Here, when φ(x,y) is a continuous function representing the envelope surface of the pixel values f1 to f4 in the L1 block (i.e., representing the gray level of an image of each point in the block), the slope cancellation function u(x,y) is a function having the same gradient as that of the continuous function φ(x,y) at the boundary of the block. In Patent Reference 1, the slope cancellation function u(x,y) is obtained as a solution of the Neumann boundary problem of the Poisson's equation.

The following are detailed calculations performed in the correction process. DCT coefficients V1, V2, V3, and V4, from which the components of the slope cancellation function of the L1 block have been cancelled, are calculated according to the following equations where "c1" to "c4" denote DCT coefficients F1 to F4 of a block to be corrected, "t1" to "t4" denote DCT coefficients F1 to F4 of an upper adjacent block of the block to be corrected, "b1" to "b4" denote DCT coefficients F1 to F4 of a lower adjacent block of the block to be corrected, "l1" to "l4" denote DCT coefficients F1 to F4 of a left adjacent block of the block to be corrected, and "r1" to "r4" denote DCT coefficients F1 to F4 of a right adjacent block of the block to be corrected.

$$V1=c1-U1=c1 \quad (5)$$

$$V2=c2-U2=c2-(t1-b1)/8 \quad (6)$$

$$V3=c3-U3=c3-(l1-r1)/8 \quad (7)$$

$$V4=c4-U4=c4-0.0551*(t3-b3+l2-r2) \quad (8)$$

In the correction process, no correction is performed on the DC DCT coefficient c1 as shown in Equation (5). In the correction process, only the AC DCT coefficients are corrected. The DCT coefficients V1, V2, V3, and V4 obtained through this correction process are the DCT coefficients L1V1, L1V2, L1V3, and L1V4 obtained as a final result of the L1 encoding process.

While Equation (10) was set forth as an equation for calculating DCT coefficients from which the components of slope cancellation function have been cancelled in a block of any pixel size in Patent Reference 1, the above Equations (5) to (8) are modifications of Equation (10) of Patent Reference 1 to suit the 2×2 pixel block.

There is no upper adjacent block of a block to be corrected when the block to be corrected is located at the top of a still image. Similarly, some adjacent block may be absent when the block to be corrected is located at the left end, the right end, or the bottom of the still image. In this case, in the correction process, the calculations of the above Equations (5) to (8) are performed using the DCT coefficients of the block to be corrected instead of using the DCT coefficients of such an absent adjacent block. The same method may be applied to correction processes of layers other than L1.

Then, in the L2 encoding process, L1 blocks are grouped in pairs in a vertical direction and L1 blocks are grouped in pairs in a horizontal direction to construct L2 blocks, each including four L1 blocks. 2×2 DCT (see FIG. 3a) and a correction process (see FIG. 3b) are performed on each of the L2 blocks constructed in this manner.

In the 2×2 DCT of the L2 encoding process, a DC DCT coefficient L1V1 of a left upper L1 block among 4 L1 blocks included in one L2 block, a DC DCT coefficient L1V1 of a left lower L1 block, a DC DCT coefficient L1V1 of a right upper L1 block, and a DC DCT coefficient L1V1 of a right lower L1 block are substituted for the elements f1, f2, f3, and f4, respectively, in the above Equations (1) to (4) to calculate DCT coefficients F1, F2, F3, and F4. The DCT coefficients F1, F2, F3, and F4 obtained in this manner are DCT coefficients L2F1, L2F2, L2F3, and L2F4 of the L2 block.

Then, in the correction process of the L2 encoding process, for each L2 block for which the DCT coefficients L2Fk (k=1–4) have been obtained, a slope cancellation function of the L2 block is canceled from the DCT coefficients L2Fk to obtain DCT coefficients L2V1, L2V2, L2V3, and L2V4. More specifically, in the correction process, DCT coefficients L2F1 to L2F4 of an L2 block to be corrected are substituted for c1 to c4 in Equations (5) to (8), DCT coefficients L2F1 to L2F4 of an upper adjacent L2 block of the L2 block to be corrected are substituted for t1 to t4, DCT coefficients L2F1 to L2F4 of a lower adjacent L2 block of the L2 block to be corrected are substituted for b1 to b4, DCT coefficients L2F1 to L2F4 of a left adjacent L2 block of the L2 block to be corrected are substituted for l1 to l4, and DCT coefficients L2F1 to L2F4 of a right adjacent L2 block of the L2 block to be corrected are substituted for r1 to r4 to calculate DCT coefficients V1, V2, V3, and V4 from which the components of the slope cancellation function of the L2 block have been cancelled. These DCT coefficients V1, V2, V3, and V4 are DCT coefficients L2V1, L2V2, L2V3, and L2V4 as a final result of the L2 encoding process.

Then, in the L3 encoding process, L2 blocks are grouped in pairs in a vertical direction and L1 blocks are grouped in pairs in a horizontal direction to construct L3 blocks, each including four L2 blocks. 2×2 DCT (see FIG. 4a) and a correction process (see FIG. 4b) are performed on each of the L3 blocks constructed in this manner.

In the 2×2 DCT of the L3 encoding process, a DC DCT coefficient L2V1 of a left upper L2 block among 4 L2 blocks included in one L3 block, a DC DCT coefficient L2V1 of a left lower L2 block, a DC DCT coefficient L2V1 of a right upper L2 block, and a DC DCT coefficient L2V1 of a right lower L2 block are substituted for the elements f1, f2, f3, and f4, respectively, in the above Equations (1) to (4) to calculate DCT coefficients F1, F2, F3, and F4. The DCT coefficients F1, F2, F3, and F4 obtained in this manner are DCT coefficients L3F1, L3F2, L3F3, and L3F4 of the L3 block.

Then, in the correction process of the L3 encoding process, for each L3 block for which the matrix of DCT coefficients L3Fk (k=1–4) has been obtained, the components of a slope cancellation function of the L3 block are canceled from the DCT coefficients L3Fk to obtain DCT coefficients L3V1, L3V2, L3V3, and L3V4. More specifically, in the correction process, DCT coefficients L3F1 to L3F4 of an L3 block to be corrected are substituted for c1 to c4 in Equations (5) to (8), DCT coefficients L3F1 to L3F4 of an upper adjacent L3 block of the L3 block to be corrected are substituted for t1 to t4, DCT coefficients L3F1 to L3F4 of a lower adjacent L3 block of the L3 block to be corrected are substituted for b1 to b4, DCT coefficients L3F1 to L3F4 of a left adjacent L3 block of the L3 block to be corrected are substituted for 11 to 14, and DCT coefficients L3F1 to L3F4 of a right adjacent L3 block of the L3 block to be corrected are substituted for r1 to r4 to calculate DCT coefficients V1, V2, V3, and V4 from which the components of the slope cancellation function of the L3 block have been cancelled. These DCT coefficients V1, V2, V3, and V4 are DCT coefficients L3V1, L3V2, L3V3, and L3V4 as a final result of the L3 encoding process.

In each of the encoding processes of layers L1 and L2 among the encoding processes of all layers described above, AC DCT coefficients among DCT coefficients obtained through the correction process are left as a final result of the encoding of the corresponding layer and DC DCT coefficients are transferred to the encoding process of the upper layer. Accordingly, when the encoding processes of all layers L1 to L3 are completed, the following information is obtained as a final encoding result for each block of 8×8 pixels.

a. AC DCT coefficients L1V2, L1V3, and L1V4 of L1 block $$3 \times ((8 \times 8)/(2 \times 2)) = 48$$

b. AC DCT coefficients L2V2, L2V3, and L2V4 of L2 block $$3 \times ((8 \times 8)/(4 \times 4)) = 12$$

c. DCT coefficients L3V1, L3V2, L3V3, and L3V4 of L3 block

Thus, a total of 64 DCT coefficients are obtained as a result of the encoding process for each block.

In FIG. 1, the quantizer 112 is a device that quantizes the 16 DCT coefficients for each block obtained through the pixel value/coefficient converter 111. The quantization is a process for dividing each DCT coefficient by a quantization scale value and outputting an integral part of the divided result as quantized data. In this embodiment, it is possible to individually specify a quantization scale value used for the quantization process for each of the layers L1, L2, and L3 by operating the operation display unit 107. The quantization scale value of each of the layers L1, L2, and L3 specified by operating the operation display unit 107 is provided to the quantizer 112 through the controller 108. The quantizer 112 quantizes the DCT coefficients L1V2, L1V3, and L1V4 of the L1 block by the quantization scale value for L1, the DCT coefficients L2V2, L2V3, and L2V4 of the L2 block by the quantization scale value for L2, and the DCT coefficients L3V1, L3V2, L3V3, and L3V4 of the L3 block by the quantization scale value for L3 and outputs the quantized data.

The variable length encoding unit 113 converts the quantized data output from the quantizer 112 into a variable length code using a known variable length coding algorithm such as Huffman coding and provides the variable length code to the output unit 105. The output unit 105 adds a header including information required for decompression of compressed image data such as a quantization scale value of each layer to a variable length code sequence output from the variable length encoding unit 113 and outputs the header-added variable length code sequence as final compressed image data.

Details of the data compressor 100 are as described above.

Reference will now be made to the data decompressor 200 according to this embodiment. As shown in FIG. 1, the data decompressor 200 includes an input unit 201, a decoder 202, a frame memory 203, a display controller 204, a display unit 205, a memory unit 206, an operation display unit 207, and a controller 208.

The input unit 201 is a device that receives compressed image data to be decompressed from the outside. In an embodiment, the input unit 201 is a communication device that receives a compressed image data file from another device through a network such as the Internet. In another embodiment, the input unit 201 is a device that reads compressed image data from an external storage medium such as an IC memory or a magnetic disk. The decoder 202 is a device that performs a decompression process on the compressed image data received through the input unit 201 and outputs image data. Details of the decoder 202 will be described later. The memory unit 206 is, for example, RAM and is used as a work area when the decoder 202 performs a decompression process. The frame memory 203 is, for example, RAM and serves to store image data obtained through the decompression process of the decoder 202. The display unit 205 includes, for example, a liquid crystal display panel and a circuit for driving the panel. The display controller 204 is a device that reads image data stored in the frame memory 203 every vertical sync period having a specific time length and provides the read image data to the display unit 205 to display a corresponding image on the display unit 205. The operation display unit 207 includes a display such as a liquid crystal display panel that displays guide information prompting a user to input a command or a control parameter and operators such as push buttons that the user operates to input a command or a control parameter. The controller 208 receives a variety of commands or control parameters through the operation display unit 207 and controls the overall operation of the data decompressor 200.

The following is a description of the decoder 202. As shown, the decoder 202 includes a variable length decoding unit 211, an inverse quantizer 212, and a coefficient/pixel value converter 213. Compressed image data received by the input unit 201 includes a header including a quantization scale value or the like of each layer and data of each block subsequent to the header. The data of each block is data that has been obtained by quantizing DCT coefficients of each layer obtained for each block (of 8×8 pixels) using a quantization scale value of the layer and then performing variable length coding on the quantized DCT coefficients of the layer. The variable length decoding unit 211 is a device that returns the variable length code to quantized data before the variable length coding was performed on the quantized data. The inverse quantizer 212 is a device that inversely quantizes the quantized data using the quantization scale value of each layer included in the header of the compressed image data and outputs DCT coefficients L3V1 to L3V4, L2V2 to L2V4, and L1V2 to L1V4 of each layer obtained through the inverse quantization for each 8×8 pixel block. The coefficient/pixe value converter 213 is a device that performs a decompression process on the DCT coefficients of the layers L1, L2, and L3 for each block (of 8×8 pixels) according to an Inverse Hierarchical Poly-Harmonic Local Cosine Transform (IH-PHLCT) algorithm which is the inverse of the HPHLCT algorithm described above. The coefficient/pixe value converter 213 is a kind of inverse orthogonal transform unit that reads the orthogonal transform coefficients of each block from the memory unit and performs an inverse transform of the orthogonal transform performed by the orthogonal transform unit on the orthogonal transform coefficients to thereby restore an image of each block.

Figure 5B:
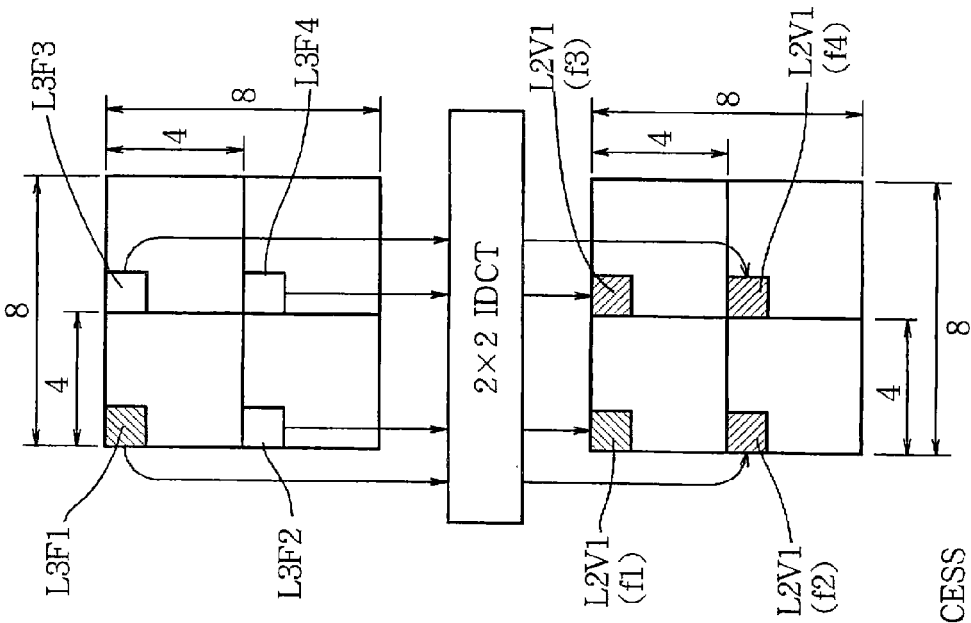
FIGS. 5a and 5b illustrate details of an L3 decoding process performed by a coefficient/pixe value converter in the data decompressor.
Figure 5A:
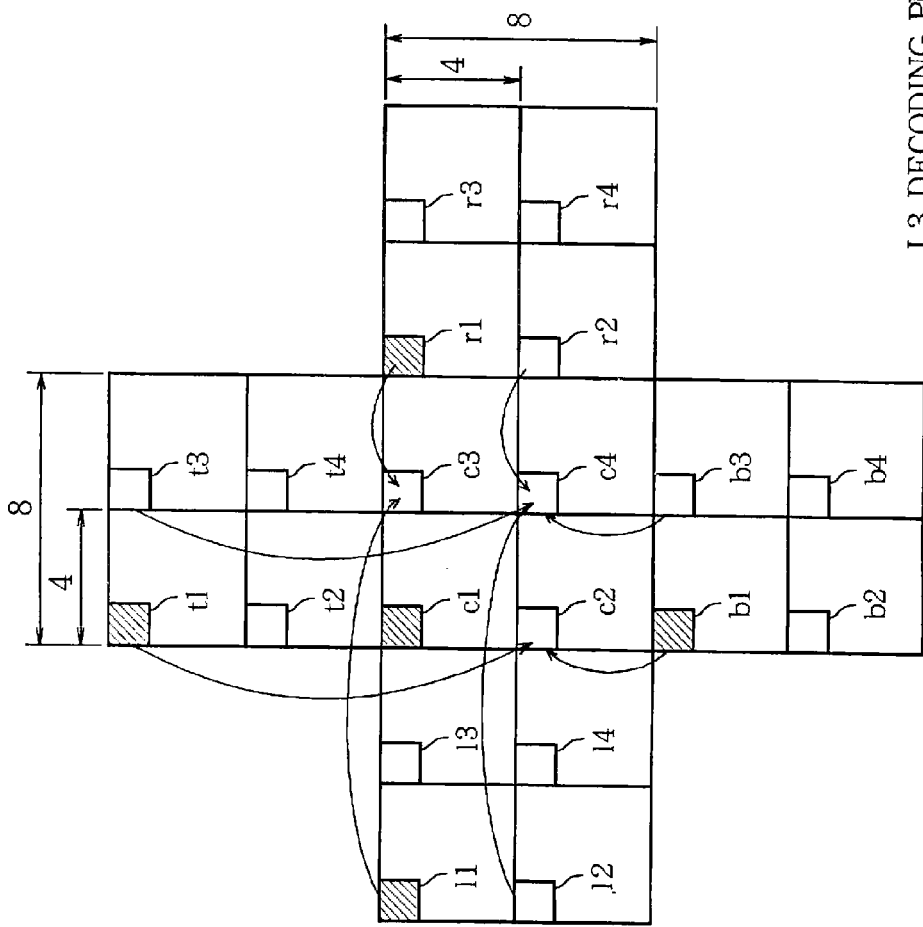
Figure 6A:
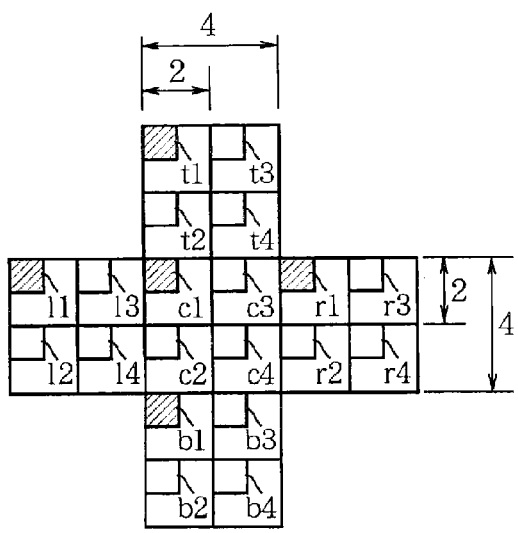
FIGS. 6a and 6b illustrate details of an L2 decoding process performed by the coefficient/pixe value converter.
Figure 6B:
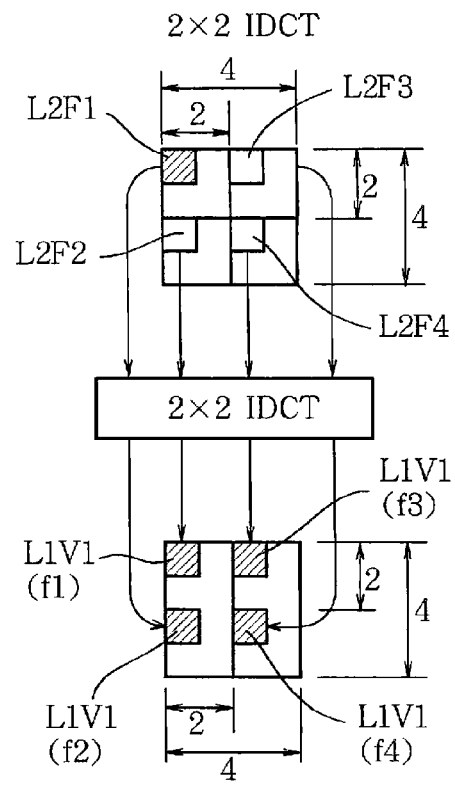
Figure 7A:
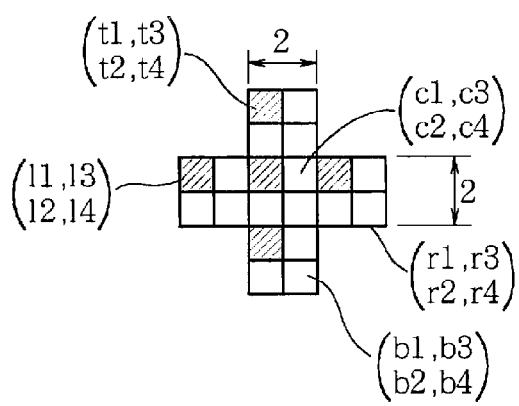
FIGS. 7a and 7b illustrate details of an L1 decoding process performed by the coefficient/pixe value converter.
Figure 7B:
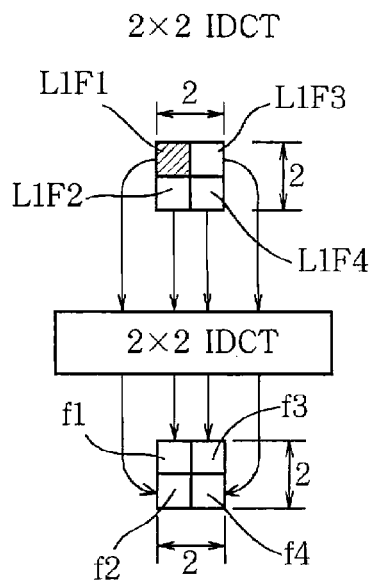

The coefficient/pixe value converter 213 performs an L3 decoding process, an L2 decoding process, and an L1 decoding process in order to obtain respective pixel values of pixels of each block from the DCT coefficients L3V1 to L3V4, L2V2 to L2V4, and L1V2 to L1V4 of each layer. FIGS. 5a and 5b illustrate details of the L3 decoding process, FIGS. 6a and 6b illustrate details of the L2 decoding process, and FIGS. 7a and 7b illustrate details of the L1 decoding process. Each of the L3 to L1 decoding processes includes a correction process illustrated in FIG. 5a, FIG. 6a, and FIG. 7a and 2×2 IDCT illustrated in FIG. 5b, FIG. 6b, and FIG. 7b. Although each of the decoding processes is performed using the memory unit 206 as a work area, a description of how the memory unit 206 is used in each decoding process is omitted for ease of explanation and a description will be given focusing on a series of arithmetic operations until pixel values are obtained from DCT coefficients.

First, in the correction process of the L3 decoding process, DCT coefficients F1, F2, F3, and F4 to which components U1 to U4 of a slope cancellation function of an L3 block to be decoded have been added are calculated according to the following equations by substituting DCT coefficients L3V1 to L3V4 of the L3 block to be decoded for data c1 to c4 in the equations, substituting DCT coefficients L3V1 and L3V3 of an upper adjacent L3 block thereof for data t1 and t3, substituting DCT coefficients L3V1 and L3V3 of a lower adjacent L3 block thereof for data b1 and b3, substituting DCT coefficients L3V1 and L3V2 of a left adjacent L3 block thereof for data l1 and l2, and substituting DCT coefficients L3V1 and L3V2 of a right adjacent L3 block thereof for data r1 and r2.

$$F1 = c1 + U1 = c1 \quad (9)$$

$$F2 = c2 + U2 = c2 + (t1-b1)/8 \quad (10)$$

$$F3 = c3 + U3 = c3 + (l1-r1)/8 \quad (11)$$

$$F4 = c4 + U4 = c4 + 0.0551*(t3-b3+l2-r2) \quad (12)$$

These DCT coefficients F1 to F4 correspond to DCT coefficients L3F1 to L3F4 of the L3 block before the correction process was performed thereon in the L3 encoding process described above (see FIG. 5a for the above procedure). An adjacent upper, lower, left, or right block may be absent when the L3 block to be decoded is located at the top, the bottom, the left end, or the right end of the still image. In this case, the DCT coefficients of the L3 block to be decoded are used instead of the DCT coefficients of such an absent adjacent L3 block. The same method may be applied to correction processes of the L2 decoding process and the L1 decoding process.

Then, in 2×2 IDCT of the L3 decoding process, elements f1, f2, f3, and f4 are calculated according to the following equations.

$$f1 = ((F1+F3)+(F2+F4))/2 \quad (13)$$

$$f2 = ((F1+F3)-(F2+F4))/2 \quad (14)$$

$$f3 = ((F1-F3)+(F2-F4))/2 \quad (15)$$

$$f4 = ((F1-F3)-(F2-F4))/2 \quad (16)$$

These elements f1 to f4 correspond to the elements f1 to f4 before 2×2 DCT was performed thereon in the L3 encoding process described above (i.e., correspond to DC DCT coefficients L2V1 of four L2 blocks included in the L3 block) (see FIG. 5b for the above procedure).

In the correction process of the L2 decoding process, DCT coefficients F1, F2, F3, and F4 to which components U1 to U4 of a slope cancellation function of an L2 block to be decoded have been added are calculated according to the above Equations (9) to (12) by substituting DCT coefficients L2V1, L2V2, L2V3, and L2V4 of the L2 block to be decoded for data c1, c2, c3, and c4 in the equations, substituting DCT coefficients L2V1 and L2V3 of an upper adjacent L2 block thereof for data t1 and t3, substituting DCT coefficients L2V1 and L2V3 of a lower adjacent L2 block thereof for data b1 and b3, substituting DCT coefficients L2V1 and L2V2 of a left adjacent L2 block thereof for data l1 and l2, and substituting DCT coefficients L2V1 and L2V2 of a right adjacent L2 block thereof for data r1 and r2. These DCT coefficients F1 to F4 correspond to DCT coefficients L2F1 to L2F4 of the L2 block before the correction process was performed thereon in the L2 encoding process described above (see FIG. 6a for the above procedure).

Then, in 2×2 IDCT of the L2 decoding process, elements f1, f2, f3, and f4 are calculated by substituting the DCT coefficients F1 to F4 calculated through the correction processes of the L2 decoding process into the above Equations (13) to (16). These elements f1 to f4 correspond to the elements f1 to f4 before 2×2 DCT was performed thereon in the L2 encoding process described above (i.e., correspond to DC DCT coefficients L1V1 of four L1 blocks included in the L2 block) (see FIG. 6b for the above procedure).

In the correction process of the L1 decoding process, DCT coefficients F1, F2, F3, and F4 to which components U1 to U4 of a slope cancellation function of an L1 block to be decoded have been added are calculated according to the above Equations (9) to (12) by substituting DCT coefficients L1V1, L1V2, L1V3, and L1V4 of the L1 block to be decoded for data c1, c2, c3, and c4 in the equations, substituting DCT coefficients L1V1 and L1V3 of an upper adjacent L1 block thereof for data t1 and t3, substituting DCT coefficients L1V1 and L1V3 of a lower adjacent L1 block thereof for data b1 and b3, substituting DCT coefficients L1V1 and L1V2 of a left adjacent L1 block thereof for data l1 and l2, and substituting DCT coefficients L1V1 and L1V2 of a right adjacent L1 block thereof for data r1 and r2. These DCT coefficients F1 to F4 correspond to DCT coefficients L1F1 to L1F4 of the L1 block before the correction process was performed thereon in the L1 encoding process described above (see FIG. 7a for the above procedure).

Then, in 2×2 IDCT of the L1 decoding process, elements f1, f2, f3, and f4 are calculated by substituting the DCT coefficients F1 to F4 calculated through the correction processes of the L1 decoding process into the above Equations (13) to (16). These elements f1 to f4 correspond to the elements f1 to f4 before 2×2 DCT was performed thereon in the L1 encoding process described above (i.e., correspond to pixel values of four pixels included in the L1 block) (see FIG. 7b for the above procedure).

Details of the L3 to L1 decoding processes are as described above.

FIG. 8 illustrates details of processes performed by a portion including the variable length decoding unit 211 and the inverse quantizer 212 and the coefficient/pixe value converter 213. As shown in FIG. 8, the memory unit 206 includes planes 206A, 206B, 206C, and 206D, each having a specific storage capacity. These planes 206A to 206D may be individual RAMs and may also be individual storage areas which do not overlap in the same RAM. For each block of 8×8 pixels, the inverse quantizer 212 writes DCT coefficients L3V1 to L3V4, L2V2 to L2V4, and L1V2 to L1V4 of each layer obtained through inverse quantization to all planes 206A to 206D of the memory unit 206. The coefficient/pixe value converter 213 performs the L3 decoding process, the L2 decoding process, and the L1 decoding process described above using the planes 206A to 206D of the memory unit 206.

One feature of this embodiment lies in the relationship between DCT coefficients of each layer and addresses at which the DCT coefficients are stored in the planes 206A to 206D when the L3 decoding process, the L2 decoding process, and the L1 decoding process are performed. The relationship between the DCT coefficients and the storage addresses thereof is described below with reference to FIGS. 9a to 9d.

In this embodiment, an area corresponding to one address of the planes 206A to 206D in the memory unit 206 has a storage capacity of 4 words. A DCT coefficient or a pixel value handled in this embodiment is expressed by one word. Accordingly, each area of the planes 206A to 206D can store four DCT coefficients or pixel values, and four DCT coefficients or pixel values can be read from or written to the planes 206A to 206D for each addressing.

Figures 9A, 9B, 9C, 9D:
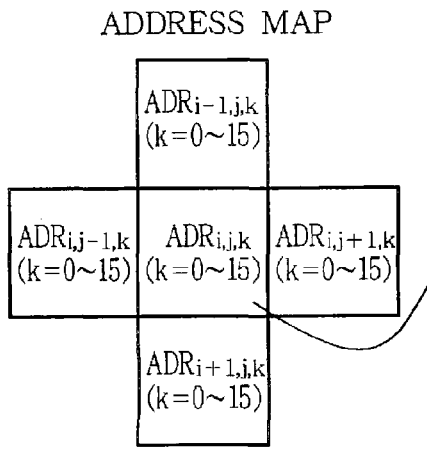
FIGS. 9a to 9d illustrate storage states of DCT coefficients and address maps of a memory unit in the data decompressor.

FIGS. 9a and 9b illustrate an address map of each of the planes 206A to 206D. In this embodiment, each of the planes 206A to 206D is divided into macro-areas, each including 16 areas. Squares illustrated in FIG. 9a represent macro-areas into which the areas of the planes 206A to 206D are divided. FIG. 9b illustrates details of one macro-area. As shown in FIG. 9b, the 16 areas of the macro-area are assigned consecutive addresses $ADR_{i,j,k}$ (k=0–15).

When the inverse quantizer 212 outputs 64 DCT coefficients representing one block (of 8×8 pixels), the 64 DCT coefficients are stored in separate units of 4 DCT coefficients in areas corresponding to addresses $ADR_{i,j,k}$ (k=0–15) in each of the planes 206A to 206D. In addition, 64 DCT coefficients of an upper adjacent block of the block are stored in areas having addresses $ADR_{i-1,j,k}$ (k=0–15), 64 DCT coefficients of a lower adjacent block of the block are stored in areas having addresses $ADR_{i+1,j,k}$ (k=0–15), 64 DCT coefficients of a left adjacent block of the block are stored in areas having addresses $ADR_{i,j-1,k}$ (k=0–15), and 64 DCT coefficients of a right adjacent block of the block are stored in areas having addresses $ADR_{i,j+1,k}$ (k=0–15).

FIG. 9c illustrates 64 DCT coefficients of one block. Numbers "1" to "64" are assigned to the DCT coefficients so as to repeat scanning in a vertical direction, and the types of the DCT coefficients of 1 to 64 are classified as indicated by a symbol of "○", a symbol of "Δ", and no symbol in FIG. 9c.

An arrangement of 64 DCT coefficients shown in FIG. 9c is an arrangement when the pixel value/coefficient converter 111 in the data compressor 100 has completed the L1 to L3 decoding processes of one block. In this manner, the DCT coefficients of the layers may be stored in the same arrangement as the original arrangement in the planes 206A to 206D and the stored arrangement may be maintained and the L3 to L1 decoding processes may then be performed.

However, in the case where this DCT coefficient storage method is employed, the number of accesses to the planes 206A to 206D for L3 to L1 decoding processes of one block is great and thus the L3 to L1 decoding processes are inefficient. Therefore, in this embodiment, when the DCT coefficients are stored in the planes 206A to 206D, DCT coefficients of each layer are stored together in the planes 206A to 206D such that the number of areas in which the DCT coefficients of the layer are stored decreases as the hierarchal level of the layer increases.

More specifically, for example, as shown in FIG. 9d, 4 DCT coefficients of an L3 block belonging to one block of 8×8 pixels are stored together in one area (at an address $ADR_{i,j,0}$) in a macro-area, 12 (AC) DCT coefficients of 4 L2 blocks belonging to the same block are stored in three areas (at an address $ADR_{i,j,1}$, an address $ADR_{i,j,4}$, and an address $ADR_{i,j,5}$) surrounding the area (at the address $ADR_{i,j,0}$) in the same macro-area, and 48 (AC) DCT coefficients of 16 L1 blocks belonging to the same block are stored in the other 12 areas in the same macro-area. This method significantly reduces the number of accesses to the planes 206A to 206D for L3 to L1 decoding processes of one block. How this advantage is achieved will be described later.

However, to store DCT coefficients in each area as shown in FIG. 9d, it is necessary to previously acquire and group 4 DCT coefficients which constitute data stored in each area. Therefore, in this embodiment, a DCT coefficient reordering circuit for facilitating grouping of DCT coefficients is provided at a position upstream of the coefficient/pixe value converter 213, specifically at an output portion of the variable length decoding unit 211 (not shown). This reordering circuit performs reordering on the DCT coefficients obtained from the variable length decoding unit 211, which have not been inversely quantized, such that DCT coefficients of each layer are arranged in an order of decreasing hierarchal level of the layer and 4 DCT coefficients to be stored in the same area are consecutive.

If reordering is performed in this manner, data stored in each area of the memory unit 206 is completed simply by grouping DCT coefficients output from the inverse quantizer 212 in units of 4 DCT coefficients in the order in which the DCT coefficients are output. In addition, the inverse quantizer 212 can efficiently perform inverse quantization using the quantization scale value of each layer since DCT coefficients of the same layer that have not been inversely quantized are sequentially input to the inverse quantizer 212.

Referring back to FIG. 8, a description will now be given of an L3 decoding process, an L2 decoding process, and an L1 decoding process and an output process in association with storage destination of each DCT coefficient. First, in the L3 decoding process, DCT coefficients L3V1, L3V2, L3V3, and L3V4 of an L3 block belonging to a block of 8×8 pixels to be decoded and DCT coefficients L3V1 and L3V2 or DCT coefficients L3V1 and L3V3 of 4 adjacent L3 blocks at the top, bottom, left, and right sides of the L3 block stored in the plane 206A are read from the plane 206A. An adjacent upper, lower, left, or right L3 block may be absent when the L3 block to be decoded is located at the top, the bottom, the left end, or the right end of the still image. In this case, the DCT coefficients of the L3 block to be decoded are used instead of the DCT coefficients of such an absent adjacent L3 block. 4 DCT coefficients L2V1 corresponding to f1 to f4 of the above Equations (13) to (16), i.e., respective DC DCT coefficients L2V1 of 4 L2 blocks included in the L3 block, are calculated based on the read data. Then, DCT coefficients L2V1 corresponding respectively to f1 to f4 are written to areas in which the DCT coefficients L3V1, L3V2, L3V3, and L3V4 of the L3 block have been stored in the plane 206B.

In the L2 decoding process, for each of the 4 L2 blocks belonging to the block of 8×8 pixels to be decoded, DCT coefficients L2V1, L2V2, L2V3, and L2V4 of the L2 block and DCT coefficients L2V1 and L2V2 or DCT coefficients L2V1 and L2V3 of 4 adjacent L2 blocks of the L2 block are read from the plane 206B. The DC DCT coefficient L2V1 among these DCT coefficients was written to the plane 206B through the L3 decoding process. 4 DCT coefficients L1V1 corresponding to f1 to f4 of the above Equations (13) to (16), i.e., respective DC DCT coefficients L1V1 of 4 L1 blocks included in the L2 block, are calculated based on the read data. Then, DCT coefficients L1V1 corresponding respectively to f2 to f4 are written to areas in which the DCT coefficients L2V2, L2V3, and L2V4 of the L2 block have been stored in the plane 206C. In addition, when a DCT coefficient that was originally stored in the area to which the DCT coefficient L2V1 of the L2 block has been written in the plane 206B is denoted by L3Vk, a DCT coefficient L1V1 corresponding to f1 is written to the area in the plane 206C in which the DCT coefficient L3Vk has been stored.

In the L1 decoding process, for each of 16 L1 blocks belonging to the block of 8×8 pixels to be decoded, DCT coefficients L1V1, L1V2, L1V3, and L1V4 of the L1 block and DCT coefficients L1V1 and L1V2 or DCT coefficients L1V1 and L1V3 of 4 adjacent L1 blocks of the L1 block are read from the plane 206C. The DC DCT coefficient L1V1 among these DCT coefficients was written to the plane 206C through the L2 decoding process. Pixel values f1, f2, f3, and f4 of the L1 block are calculated based on the read data. Then, the pixel values f1, f2, f3, and f4 are written to areas in which the DCT coefficients L1V2, L1V3, and L1V4 of the L1 block have been stored in the plane 206D. In addition, when a DCT coefficient that was originally stored in the area to which the DCT coefficient L1V1 of the L1 block has been written in the plane 206C is denoted by L2Vk, the pixel value f1 is written to the area in the plane 206D in which the DCT coefficient L2Vk has been stored.

In the output process, each pixel value stored in the plane 206D is read and each read pixel value is mapped to an area which is to be occupied by the pixel value in the frame memory 203. More specifically, for example when numbers are assigned respectively to 8×8 pixels of the block as shown in FIG. 9c, pixel values of the pixels reordered as shown in FIG. 9d are stored in the plane 206D. In the output process, reordering is performed to return the arrangement of FIG. 9d to that of FIG. 9c while each pixel value stored in the plane 206D is mapped to an area in the frame memory 203.

In this embodiment, the coefficient/pixe value converter 213 does not wait until the variable length decoding unit 211 and the inverse quantizer 212 complete variable length decoding and inverse quantization of all compressed image data but instead activates the L3 decoding process when a number of DCT coefficients corresponding to a predetermined number of block lines that are used for conversion into pixel values have been written to the plane 206A through the processes of the variable length decoding unit 211 and the inverse quantizer 212. The same method is applied to the L2 decoding process subsequent to the L3 decoding process, the L1 decoding process, and the output process. The coefficient/pixe value converter 213 does not wait until all previous processes are completed but instead activates a subsequent process when a predetermined amount of data used for the subsequent process has been obtained through the previous processes.

For example, in the L2 decoding process, the coefficient/pixe value converter 213 refers to the DCT coefficient L2V1 that has been written to the plane 206B through the L3 decoding process. Accordingly, in this embodiment, the coefficient/pixe value converter 213 controls the timing of activating the L2 decoding process such that the L2 decoding process of a block line is activated after a number of DCT coefficients L2V1 corresponding to the block line are written to the plane 206B through the L3 decoding process. The same method is applied to the relationship between the L2 decoding process and the L1 decoding process and the relationship between the L1 decoding process and the output process. This is another feature of this embodiment.

The manner in which the memory unit 206 is accessed in each of the L3 to L1 decoding processes will now be described in detail with reference to FIGS. 10 to 12. Specifically, in the following description, reference will be made to the number of accesses to the memory unit 206 in each of the case where DCT coefficients have not been reordered and the case where DCT coefficients have been reordered according to this embodiment. Here, it is assumed that DCT coefficients of L3 to L1 blocks belonging to a block of 8×8 pixels to be detected are stored in a macro-area at an address $ADR_{i,j,k}$ (k=0–15) shown in FIG. 9a in the planes 206A to 206D of the memory unit 206, DCT coefficients of L3 to L1 blocks belonging to an upper adjacent block of the block to be decoded are stored in a macro-area at an address $ADR_{i-1,j,k}$ (k=0–15), DCT coefficients of L3 to L1 blocks belonging to a lower adjacent block of the block to be decoded are stored in a macro-area at an address $ADR_{i+1,j,k}$ (k=0–15), DCT coefficients of L3 to L1 blocks belonging to a left adjacent block of the block to be decoded are stored in a macro-area at an address $ADR_{i,j-1,k}$ (k=0–15), and DCT coefficients of L3 to L1 blocks belonging to a right adjacent block of the block to be decoded are stored in a macro-area at an address $ADR_{i,j+1,k}$ (k=0–15).

It is also assumed that the arrangement of DCT coefficients in each macro-area in the case where DCT coefficients have not been reordered is as shown in FIG. 9c described above and the arrangement of DCT coefficients in each macro-area in the case where DCT coefficients have been reordered is as shown in FIG. 9d described above.

First, reference is made to the manner in which the memory unit 206 is accessed in the L3 decoding process.

The following data read processes are performed in the L3 decoding process in the case where DCT coefficients have not been reordered.

a3. DCT coefficients L3V1, L3V2, L3V3, and L3V4 ("1", "5", "33", and "37" in FIG. 10a) of an L3 block belonging to the block to be decoded shown in FIG. 10a are read from areas at addresses $ADR_{i,j,0}$, $ADR_{i,j,2}$, $ADR_{i,j,8}$, and $ADR_{i,j,10}$ in the plane 206A.

b3. DCT coefficients L3V1 and L3V3 ("1" and "33" in FIG. 10a) of an L3 block belonging to an upper adjacent block of the block to be decoded shown in FIG. 10a are read from areas at addresses $ADR_{i-1,j,0}$ and $ADR_{i-1,j,8}$ in the plane 206A.

c3. DCT coefficients L3V1 and L3V3 ("1" and "33") of an L3 block belonging to a lower adjacent block of the block to be decoded shown in FIG. 10a are read from areas at addresses $ADR_{i+1,j,0}$ and $ADR_{i+1,j,8}$ in the plane 206A.

d3. DCT coefficients L3V1 and L3V2 ("1" and "5") of an L3 block belonging to a left adjacent block of the block to be decoded shown in FIG. 10a are read from areas at addresses $ADR_{i,j-1,0}$ and $ADR_{i,j-1,2}$ in the plane 206A.

e3. DCT coefficients L3V1 and L3V2 ("1" and "5") of an L3 block belonging to a right adjacent block of the block to be decoded shown in FIG. 10a are read from areas at addresses $ADR_{i, j+1, 0}$ and $ADR_{i, j+1, 2}$ in the plane 206A. Also refer to FIGS. 9a to 9c for these processes.

Accordingly, the number of times the memory is read per block of 8×8 pixels in the L3 decoding process is "12" in the case where DCT coefficients have not been reordered.

In addition, the following data write processes are performed in the L3 decoding process in the case where DCT coefficients have not been reordered.

f3. DC DCT coefficients L2V1 ("1", "5", "33", and "37" in FIG. 10a) of 4 L2 blocks obtained as a result of the decoding are written to areas at addresses $ADR_{i,j,0}$, $ADR_{i,j,2}$, $ADR_{i,j,8}$, and $ADR_{i,j,10}$ in the plane 206B.

Accordingly, the number of times the memory is written per block of 8×8 pixels in the L3 decoding process is "4" in the case where DCT coefficients have not been reordered.

On the other hand, the following data read processes are performed in the L3 decoding process in the case where DCT coefficients have been reordered.

a3'. DCT coefficients L3V1, L3V2, L3V3, and L3V4 ("1", "5", "33", and "37") of an L3 block belonging to the block to be decoded shown in FIG. 10b are read from an area at an $ADR_{i,j,0}$ in the plane 206A.

b3'. DCT coefficients L3V1 and L3V3 ("1" and "33") of an L3 block belonging to an upper adjacent block of the block to be decoded shown in FIG. 10b are read from an area at an $ADR_{i-1,j,0}$ in the plane 206A.

c3'. DCT coefficients L3V1 and L3V3 ("1" and "33") of an L3 block belonging to a lower adjacent block of the block to be decoded shown in FIG. 10b are read from an area at an $ADR_{i+1,j,0}$ in the plane 206A.

d3'. DCT coefficients L3V1 and L3V2 ("1" and "5") of an L3 block belonging to a left adjacent block of the block to be decoded shown in FIG. 10b are read from an area at an $ADR_{i, i-1, 0}$ in the plane 206A.

e3'. DCT coefficients L3V1 and L3V2 ("1" and "5") of an L3 block belonging to a left adjacent block of the block to be decoded shown in FIG. 10b are read from an area at an $ADR_{i, j+1, 0}$ in the plane 206A. Also refer to FIGS. 9a, 9b, and 9d for these processes.

Accordingly, the number of times the memory is read per block of 8×8 pixels in the L3 decoding process is "5" in the case where DCT coefficients have been reordered.

In addition, the following data write processes are performed in the L3 decoding process in the case where DCT coefficients have been reordered.

f3'. DC DCT coefficients L2V1 ("1", "5", "33", and "37" in FIG. 10b) of 4 L2 blocks obtained as a result of the decoding are written to areas at an address $ADR_{i, j, 0}$ in the plane 206B.

Accordingly, the number of times the memory is written per block of 8×8 pixels in the L3 decoding process is "1" in the case where DCT coefficients have been reordered.

Reference will now be made to the number of times the memory is accessed in the L2 decoding process.

The following data read processes are performed in the L2 decoding process in the case where DCT coefficients have not been reordered.

a2. DCT coefficients L2V1, L2V2, L2V3, and L2V4 ("1", "3", "17", "19", "5", "7", "21", "23", "33", "35", "49", "51", "37", "39", "53", and "55" in FIG. 11a) of 4 L2 blocks belonging to the block to be decoded shown in FIG. 11a are read from areas at addresses $ADR_{i, j, 0}$, $ADR_{i, j, 1}$, $ADR_{i, j, 4}$, $ADR_{i,j,5}$, $ADR_{i,j,2}$, $ADR_{i,j,3}$, $ADR_{i,j,6}$, $ADR_{i,j,7}$, $ADR_{i,j,8}$, $ADR_{i, j, 9}$, $ADR_{i, j, 12}$, $ADR_{i, j, 13}$, $ADR_{i, j, 10}$, $ADR_{i, j, 11}$, $ADR_{i,j,14}$, $ADR_{i,j,15}$ in the plane 206B.

b2. DCT coefficients L2V1 and L2V3 ("5", "21", "37", and "53" in FIG. 11a) of two lowermost L2 blocks among 4 L2 blocks belonging to an upper adjacent block of the block to be decoded shown in FIG. 11a are read from areas at addresses $ADR_{i-1,j, 2}$, $ADR_{i-1,j, 6}$, $ADR_{i-1,j, 10}$, and $ADR_{i-1,j, 14}$ in the plane 206B.

c2. DCT coefficients L2V1 and L2V3 ("1", "17", "33", and "49" in FIG. 11a) of two uppermost L2 blocks among 4 L2 blocks belonging to a lower adjacent block of the block to be decoded shown in FIG. 11a are read from areas at addresses $ADR_{i+1, j, 0}$, $ADR_{i+1, j, 4}$, $ADR_{i+1, j, 8}$, and $ADR_{i+1, j, 12}$ in the plane 206B.

d2. DCT coefficients L2V1 and L2V2 ("33", "35", "37", and "39" in FIG. 11a) of two rightmost L2 blocks among 4 L2 blocks belonging to a left adjacent block of the block to be decoded shown in FIG. 11a are read from areas at addresses $ADR_{i, j-1, 8}$, $ADR_{i, j-1, 9}$, $ADR_{i, j-1, 10}$, and $ADR_{i, j-1, 11}$ in the plane 206B. Also refer to FIGS. 9a to 9c for these processes.

e2. DCT coefficients L2V1 and L2V2 ("1", "3", "5", and "7" in FIG. 11a) of two leftmost L2 blocks among 4 L2 blocks belonging to a right adjacent block of the block to be decoded shown in FIG. 11a are read from areas at addresses $ADR_{i, j+1, 0}$, $ADR_{i, j+1, 1}$, $ADR_{i, j+1, 2}$, and $ADR_{i, j+1, 3}$ in the plane 206B. Also refer to FIGS. 9a to 9c for these processes.

Accordingly, the number of times the memory is read per block of 8×8 pixels in the L2 decoding process is "32" in the case where DCT coefficients have not been reordered.

In addition, the following data write processes are performed in the L2 decoding process in the case where DCT coefficients have not been reordered.

f2. DC DCT coefficients L1V1 ("1", "3", "17", "19", "5", "7", "21", "23", "33", "35", "49", "51", "37", "39", "53", and "55" in FIG. 11a) of 16 L1 blocks obtained as a result of the decoding are written to areas at addresses $ADR_{i, j, 0}$, $ADR_{i,j,1}$, $ADR_{i,j,4}$, $ADR_{i,j,5}$, $ADR_{i,j,2}$, $ADR_{i,j,3}$, $ADR_{i,j,6}$, $ADR_{i, j, 7}$, $ADR_{i, j, 8}$, $ADR_{i, j, 9}$, $ADR_{i, j, 12}$, $ADR_{i, j, 13}$, $ADR_{i,j,10}$, $ADR_{i,j,11}$, $ADR_{i,j,14}$, $ADR_{i,j,15}$ in the plane 206C.

Accordingly, the number of times the memory is written per block of 8×8 pixels in the L2 decoding process is "16" in the case where DCT coefficients have not been reordered.

On the other hand, the following data read processes are performed in the L2 decoding process in the case where DCT coefficients have been reordered.

a2'. The DCT coefficients L2V1, L2V2, L2V3, and L2V4 of the 4 L2 blocks that were read in the above a2 process correspond to those of "1", "3", "17", "19", "5", "7", "21", "23", "33", "35", "49", "51", "37", "39", "53", and "55" in FIG. 11b, which are stored in areas at addresses $ADR_{i, j, 0}$, $ADR_{i, j, 1}$, $ADR_{i, j, 4}$, and $ADR_{i, j, 5}$ in the plane 206B. Accordingly, the DCT coefficients stored in these areas are read in this process.

b2'. The DCT coefficients L2V1 and L2V3 of the 2 L2 blocks that were read in the above b2 process correspond to those of "5", "21", "37", and "53" in FIG. 11b, which are stored in areas at addresses $ADR_{i-1, j, 0}$ and $ADR_{i-1, j, 4}$ in the plane 206B. Accordingly, the DCT coefficients stored in these areas are read in this process.

c2'. The DCT coefficients L2V1 and L2V3 of the 2 L2 blocks that were read in the above c2 process correspond to those of "1", "7", "33", and "49" in FIG. 11b, which are stored in areas at addresses $ADR_{i+1, j, 0}$ and $ADR_{i+1, j, 4}$ in the plane 206B. Accordingly, the DCT coefficients stored in these areas are read in this process.

d2'. The DCT coefficients L2V1 and L2V2 of the 2 L2 blocks that were read in the above d2 process correspond to those of "33", "35", "37", and "39" in FIG. 11b, which are stored in areas at addresses $ADR_{i, j-1, 0}$ and $ADR_{i, j-1, 1}$ in the plane 206B. Accordingly, the DCT coefficients stored in these areas are read in this process.

e2'. The DCT coefficients L2V1 and L2V2 of the 2 L2 blocks that were read in the above e2 process correspond to those of "1", "3", "5", and "7" in FIG. 11b, which are stored in areas at addresses $ADR_{i,j+1,0}$ and $ADR_{i,j+1,1}$ in the plane 206B. Accordingly, the DCT coefficients stored in these areas are read in this process. Also refer to FIGS. 9a, 9b, and 9d for these processes.

Accordingly, the number of times the memory is read per block of 8×8 pixels in the L2 decoding process is "12" in the case where DCT coefficients have not been reordered.

In addition, the following data write processes are performed in the L2 decoding process in the case where DCT coefficients have been reordered.

f2'. DC DCT coefficients L1V1 ("1", "3", "17", "19", "5", "7", "21", "23", "33", "35", "49", "51", "37", "39", "53", and "55" in FIG. 11b) of 16 L1 blocks obtained as a result of the decoding are written to areas at addresses $ADR_{i,j,0}$, $ADR_{i,j,1}$, $ADR_{i,j,4}$, and $ADR_{i,j,5}$ in the plane 206C.

Accordingly, the number of times the memory is written per block of 8×8 pixels in the L2 decoding process is "4" in the case where DCT coefficients have been reordered.

Figure 12A:
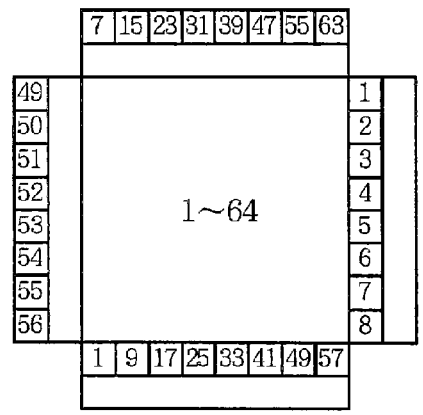
FIGS. 12a and 12b illustrate how the memory unit is accessed in the L1 decoding process.
Figure 12B:
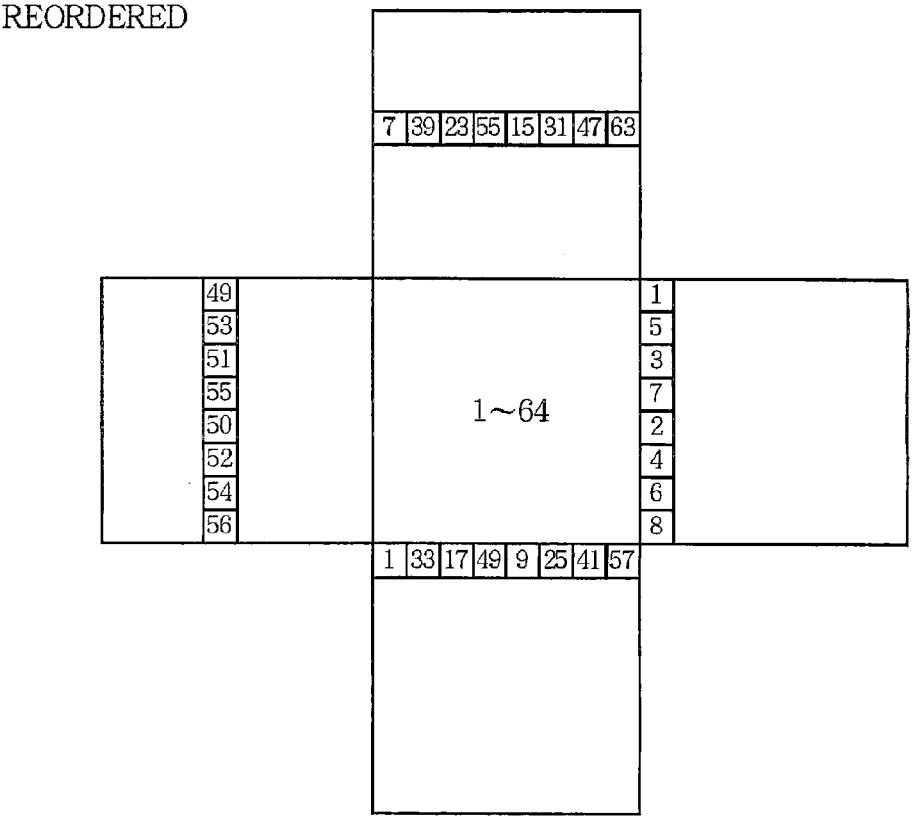

The manner in which the memory unit 206 is accessed in the L1 decoding process in the case where reordering has been performed and in the case where no reordering has been performed is as shown in FIGS. 12a and 12b. DCT coefficients denoted by numbers in FIGS. 12a and 12b are the objects to be accessed.

In the L1 decoding process, 64 DCT coefficients in a block to be decoded are read in both the case where reordering has been performed and the case where no reordering has been performed. Here, the number of times the plane 206C is read is 16. In addition, in the L1 decoding process, (a total of 32) DCT coefficients of each L1 block nearest to the block to be decoded among L1 blocks included in 4 adjacent blocks at the top, bottom, left, and right sides of the block to be decoded are read. These DCT coefficients have been stored in 16 areas in the plane 206C in both the case where reordering has been performed and the case where no reordering has been performed. Accordingly, here, the number of times the memory unit 206 is read is 16. Thus, the number of times the memory unit 206 is read in the L1 decoding process is 32 in both the case where reordering has been performed and the case where no reordering has been performed.

In the L1 decoding process, 64 pixel values are written to 16 areas of the plane 206D corresponding to the block to be decoded. Accordingly, the number of times the memory unit 206 is written in the L1 decoding process is 16 in both the case where reordering has been performed and the case where no reordering has been performed.

In summary, the total number of times the memory unit 206 is read in the L3 to L1 decoding processes is 76 per block and the total number of times writing is made to the memory unit 206 is 36 per block in the case where DCT coefficients have not been reordered. On the other hand, the total number of times the memory unit 206 is read in the L3 to L1 decoding processes is 49 per block and the total number of times writing is made to the memory unit 206 is 21 per block in the case where DCT coefficients have been reordered according to this embodiment.

Details of this embodiment are as described above.

This embodiment has the following advantages.

(1) According to this embodiment, it is possible to efficiently perform a decompression process on compressed image data since the number of accesses to the memory unit 206 required during L3 to L1 decoding processes is small.

(2) According to this embodiment, the coefficient/pixe value converter 213 activates the L3 decoding process when DCT coefficients corresponding to a predetermined number of block lines used for conversion into pixel values have been written, without waiting until the variable length decoding unit 211 and the inverse quantizer 212 complete variable length decoding and inverse quantization of all compressed image data. Accordingly, for example, even if the total time required for the processes of the variable length decoding unit 211 and the inverse quantizer 212 is long in the case where compressed image data is read from an external storage medium to perform a decompression process, it is possible to quickly activate the L3 decoding process and to quickly output a result of the decompression process.

Figure 13:
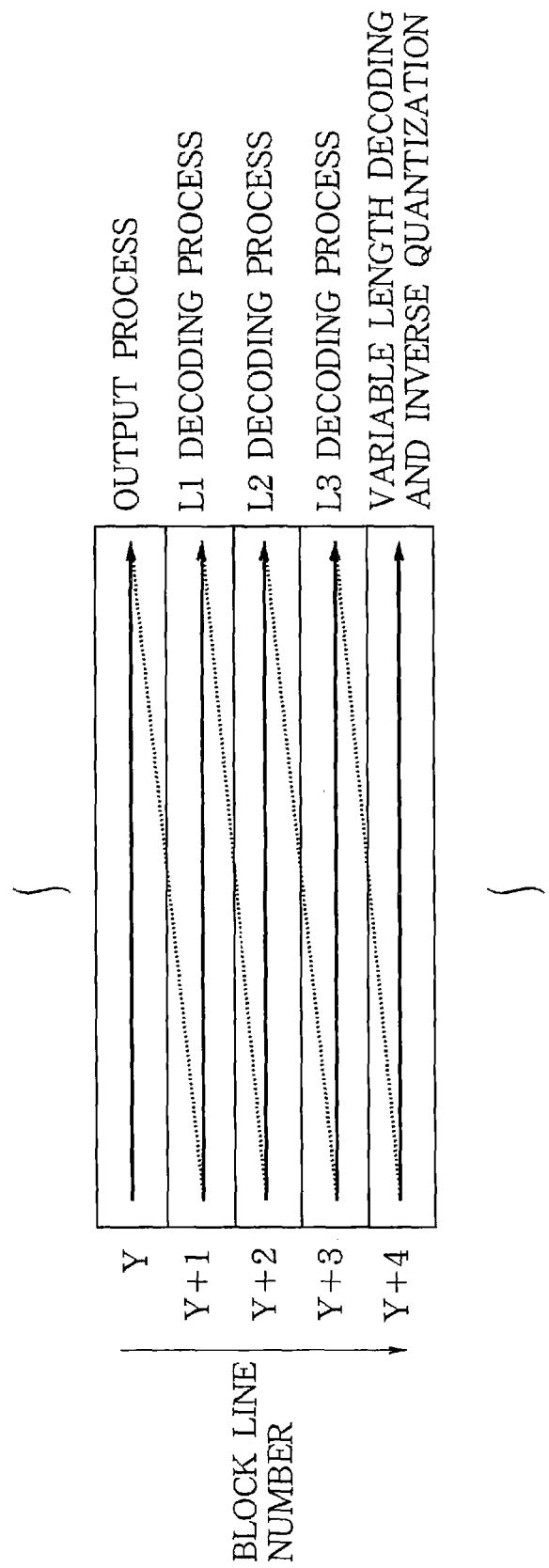
FIG. 13 illustrates an example of parallel execution of processes in a data decompression process in the embodiment.

(3) According to this embodiment, when the coefficient/pixe value converter 213 performs the L3 decoding process, the L2 decoding process, the L1 decoding process, and the output process, the coefficient/pixe value converter 213 activates each process immediately after data required for the process are obtained through preceding processes without waiting until all the preceding processes are completed. One example is shown in FIG. 13. In this example, when the variable length decoding unit 211 and the inverse quantizer 212 are performing variable length decoding and inverse quantization on data of each block of a block line "Y+4", the coefficient/pixe value converter 213 performs an L3 decoding process on each block of a block line "Y+3", an L2 decoding process on each block of a block line "Y+2", an L1 decoding process on each block of a block line "Y+1", and an output process on each block of a block line "Y". Thus, according to this embodiment, it is possible to reduce the time until display of a decompressed image is activated after a data decompression process is activated.

Although the invention has been described with reference to the above embodiment, the invention can provide other embodiments. The following are examples.

(1) The storage capacity of each area in the memory unit 206 is not limited to 4 words and may be, for example, 16 words. When a memory with a storage capacity of 16 words per area is used as the memory unit 206, 16 DCT coefficients can be stored in one area. In this case, for example, DCT coefficients of each layer may be stored together in each area such that the number of areas in which the DCT coefficients of the layer are stored decreases as the hierarchal level of the layer of the DCT coefficients (L3 and L2 in an example of FIG. 14) increases as shown in FIG. 14. In this case, it is also possible to reduce the number of times the memory unit 206 is accessed in the L3 to L1 decoding processes, similar to the above embodiment.

Figure 15:
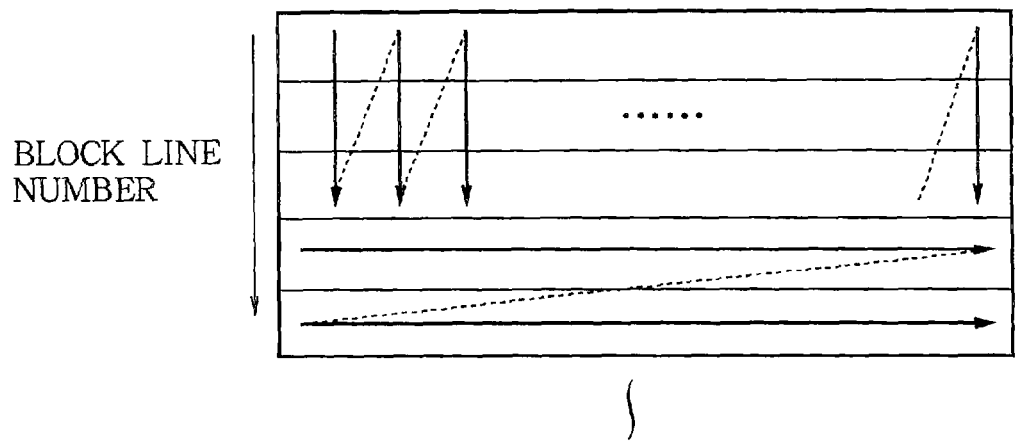
FIG. 15 illustrates a sequence of data in compressed image data output from a data compressor in another embodiment of the invention.

(2) The data compressor 100 may be constructed as follows. When an arrangement of N rows and M columns (N>1 and M>1) of blocks of an uppermost layer is obtained from a still image, the data compressor 100 repeats an operation for selecting N0 blocks of the uppermost layer belonging to the same column while sequentially shifting the column for blocks of the uppermost layer of first N0 rows and M columns (N0<N and N0<M) and outputs data corresponding to each block of the uppermost layer of the N0 rows and the M columns in compressed image data in an order in which each block was selected. Then, the data compressor 100 repeats an operation for selecting M blocks of the uppermost layer belonging to the same row while sequentially shifting the row for remaining blocks of the uppermost layer of N-N0 rows and M columns and outputs data corresponding to each block of the uppermost layer of N-N0 rows and M columns in the compressed image data in an order in which each block was selected. FIG. 15 illustrates an example sequence of data in such compressed image data. In the example of FIG. 15, blocks in a range of 3 block lines, from the top, of a still image are (primarily) scanned in a vertical direction while positions of the primary scanning are (secondarily) scanned in a horizontal direction and respective compressed data of the blocks are arranged in a start portion of the compressed image data in an order in which the blocks have been scanned. Then, for each of the 4th and subsequent block lines, blocks of the block line are (primarily) scanned in a horizontal direction while the block lines to be scanned are (secondarily) scanned in a vertical direction and respective compressed data of the blocks are arranged in a subsequent portion of the compressed image data in an order in which the blocks have been scanned. If the compressed image data is constructed in this manner, it is possible to accelerate generation of blocks on which the L3 decoding process can be performed with reference to DCT coefficients of upper, lower, left, and right adjacent blocks and to advance the timing of activation of the L3 decoding process. Specifically, when variable length decoding and inverse quantization of DCT coefficients of 8 blocks (i.e., the blocks of 3 block lines in the 1st column, the blocks of 3 block lines in the 2nd column, and the blocks of 2 block lines in the 3rd column) have been completed and thus DCT coefficients of these blocks have been written to the memory unit 206, the L3 decoding process can be performed on the block of the 2nd block line in the 2nd column since DCT coefficients of adjacent blocks at top, bottom, left, and right sides of the block have been stored in the memory unit 206.

Figure 16:
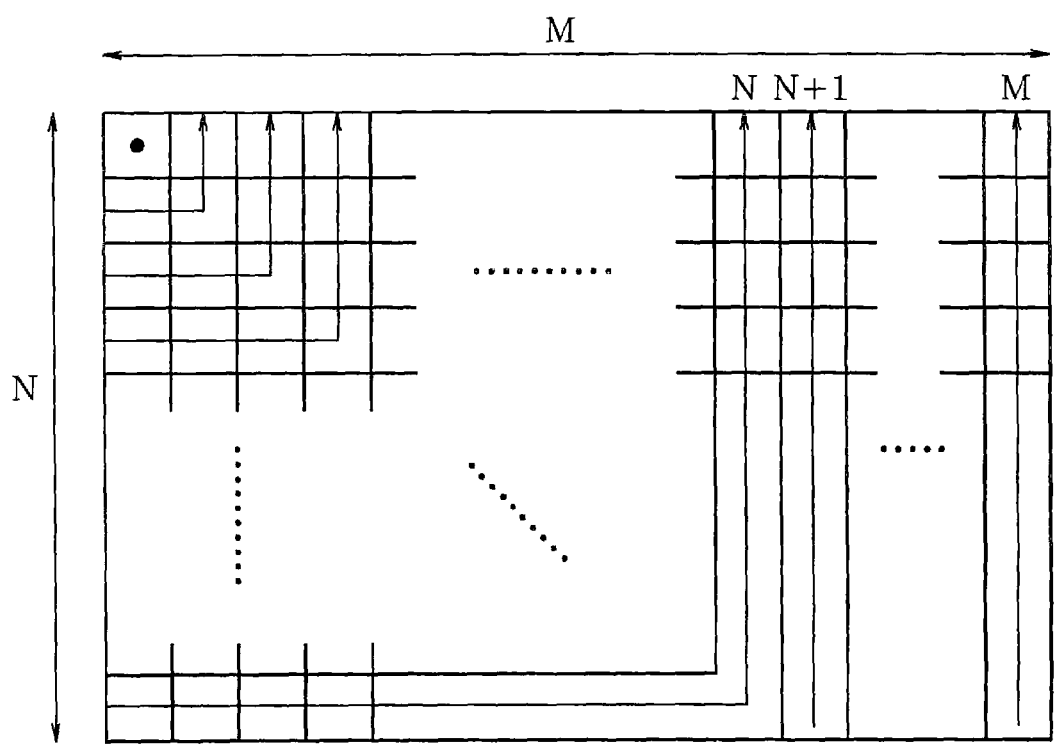
FIG. 16 illustrates a sequence of data in compressed image data output from a data compressor in another embodiment of the invention.

(3) A sequence of data in compressed image data output by the data compressor 100 may be as shown in FIG. 16. In an example illustrated in FIG. 16, when an arrangement of N rows and M columns (N>1, M>1, and N<M) of blocks of an uppermost layer is obtained from a still image, the data compressor 100 initially selects a block of the 1st row and the 1st column and then selects each block of an L-shaped block sequence surrounding the block (specifically, blocks of the 2nd row and the 1st column, the 2nd row and the 2nd column, the 1st row and the 2nd column, and the 1st row and the 2nd column), and then selects data of each block of an L-shaped block sequence surrounding the selected range of blocks. In this manner, the data compressor 100 sequentially selects each L-shaped sequence of blocks outside the selected range of blocks. Then, after selecting data of an L-shaped block sequence including the Nth row, the data compressor 100 sequentially selects blocks of each column from the N+1th column to the Mth column in the still image. The data compressor 100 then outputs data corresponding to each block of the uppermost layer in the compressed image data in an order in which each block was selected. In this case, it is possible to accelerate generation of blocks on which the L3 decoding process can be performed with reference to DCT coefficients of upper, lower, left, and right adjacent blocks and to advance the timing of activation of the L3 decoding process, similar to the example of FIG. 15. Although a block of a left upper corner among four corners of the arrangement of blocks of the uppermost layer is initially selected in the example illustrated in FIG. 16, another block may also be selected initially. In addition, the number of rows N of blocks may be greater than the number of columns M. In this case, when data of an L-shaped block sequence including the Mth column has been selected, no further L-shaped block sequence is present outside the selected range of blocks. Therefore, the data compressor 100 sequentially selects blocks of each row from the M+1th row to the Nth row in the arrangement of blocks.

(4) Although the encoding and decoding processes of the three (L1 to L3) layers have been performed in the above embodiment, the number of layers of the encoding and decoding processes is optional and encoding and decoding processes of four or more layers may be performed.

(5) In the above embodiment, the coefficient/pixe value converter 213 performs the L3 decoding process, the L2 decoding process, the L1 decoding process, and the output process using 4 planes 206A to 206D. However, these processes may each be performed by alternately using the 2 planes 206A and 206B as shown in FIG. 17. In the example illustrated in FIG. 17, for each block of 8×8 pixels, the inverse quantizer 212 writes DCT coefficients L3V1 to L3V4, L2V2 to L2V4, and L1V2 to L1V4 of each layer belonging to the block to both the plane 206A and the plane 206B, similar to the above embodiment. Then, in the L3 decoding process, DCT coefficients L3V1 to L3V4 of an L3 block belonging to the block for which the writing has been performed are converted into DC DCT coefficients L2V1 of 4 L2 blocks. Each of the 4 DCT coefficients L2V1 is written to an area in which the DCT coefficients L3V1 to L3V4 of the L3 block has been stored in the plane 206B. Then, an L2 block DC, for which the DCT coefficients L2V1 have been written to the plane 206B through the L3 decoding process, is processed in the L2 decoding process. That is, in the L2 decoding process, the DCT coefficients L2V1 to L2V4 of an L2 block, the DCT coefficients L2V1 of which have been written, are read from the plane 206B and are then converted into DC DCT coefficients L1V1 of the 4 L1 blocks. Then, the 4 DCT coefficients L2V1 are written to storage areas of the DCT coefficients L2V1 to L2V4 of the L2 block in the plane 206A. Here, in the case of the DCT coefficients L2V1, the storage area of the DCT coefficients L2V1 is the area in which the DCT coefficients L3Vk have been stored before the DCT coefficients L2V1 are written. Then, in the L1 decoding process, the L1 block, for which the DC DCT coefficients L1V1 have been written through the L2 decoding process to the plane 206A, is processed. That is, in the L1 decoding process, the DCT coefficients L1V1 to L1V4 of an L1 block, for which the DCT coefficients L1V1 have been written, are read from the plane 206A and are then converted into 4 pixel values f1 to f4. Then, the 4 pixel values f1 to f4 are written to an area corresponding to the L1 block in the plane 206B. In the output process, a block of 8×8 pixels, pixel values of which have been written to the plane 206B, is processed. According to this embodiment, it is possible to reduce the size of the data decompressor 200 since only two planes 206A and 206B are used.

(6) In the above embodiment, the data compressor 100 uses HPHLCT as an orthogonal transform and the data decompressor 200 uses IHPHLCT as an inverse transform of the HPHLCT. However, an orthogonal transform or an inverse transform other than HPHLCT and IHPHLCT may be used. For example, in the data compressor 100, DCT may be performed on each block without hierarchizing the block and compressed image data then may be created using DCT coefficients and, in the data decompressor 200, the coefficient/pixe value converter 213 may convert DCT coefficients of each block into pixel values in parallel with writing of the DCT coefficients of each block to the memory unit 206.

What is claimed is:

1. A data decompressor that performs a decompression process on compressed image data generated by a data compressor, the data compressor including a pixel value/coefficient converter that sequentially performs encoding processes of a plurality of layers on an image to be compressed, the data compressor generating the compressed image data representing Discrete Cosine Transform (DCT) coefficients of a block of each layer obtained through the encoding process of each layer, wherein, in an encoding process of a lowermost layer, the pixel value/coefficient converter divides the image to be compressed into blocks of a predetermined pixel size and performs DCT on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block, and in an encoding process of each upper layer above the lowermost layer, the pixel value/coefficient converter constructs blocks of the upper layer, each block of the upper layer including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer, the data decompressor comprising:

a memory;

a write unit that sequentially extracts DCT coefficients of a block of an uppermost layer and a block of each layer belonging to the block of the uppermost layer from the compressed image data, and writes the extracted DCT coefficients to the memory; and a coefficient/pixel value converter that sequentially performs a decoding process of each layer, from the uppermost layer to the lowermost layer, using DCT coefficients obtained as a result of the encoding process of each layer represented by the compressed image data, and calculates the pixel values of the image before compression, wherein, in the decoding process of each layer other than the lowermost layer, the coefficient/pixel value converter performs a correction process on each block of each layer by adding DCT coefficients of a slope cancellation function of the block to DCT coefficients of the block with reference to DCT coefficients of the layer of adjacent blocks at top, bottom, left, and right sides of the block previously stored in the memory, and performs inverse DCT on the DCT coefficients of the block that has been subjected to the correction process to calculate DCT coefficients of DC component of each of a plurality of blocks of a lower layer below the layer into which the block of the layer has been divided, and writes the DCT coefficients of DC component of the block of the lower layer to the memory, and wherein in the decoding process of the lowermost layer, the coefficient/pixel value converter performs a correction process on each block of the lowermost layer by adding DCT coefficients of a slope cancellation function of the block to DCT coefficients of the block with reference to DCT coefficients of the lowermost layer of adjacent blocks at top, bottom, left, and right sides of the block previously stored in the memory, and performs inverse DCT on the DCT coefficients of the block that has been subjected to the correction process to calculate pixel values of the block of the lowermost layer and writes the pixel values of the block of the lowermost layer to the memory, and wherein the coefficient/pixel value converter performs the decoding process of each layer in parallel by setting a phase difference of the decoding process between a lower layer and an upper layer that the decoding process of the lower layer is performed using required DCT coefficients after the DCT coefficients required by the decoding process of the lower layer are written to the memory through the decoding process of the upper layer.

2. A data compressor comprising:

a pixel value/coefficient converter that sequentially performs encoding processes of a plurality of layers on an image to be compressed, wherein, in an encoding process of a lowermost layer, the pixel value/coefficient converter divides the image to be compressed into blocks of a predetermined pixel size and performs Discrete Cosine Transform (DCT) on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block, and wherein, in an encoding process of each upper layer above the lowermost layer, the pixel value/coefficient converter constructs blocks of the upper layer, each block of the upper layer including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer, and outputs the DCT coefficients of each block of each layer that have been obtained through the encoding process of each layer; and an output unit that collectively orders DCT coefficients of blocks of each layer belonging to each block of an uppermost layer, and outputs the ordered DCT coefficients as compressed image data, wherein, when an arrangement of N rows and M columns (N>1 and M>1) of blocks of the uppermost layer is obtained from a still image, the output unit repeats an operation for selecting N0 blocks of the uppermost layer belonging to the same column while sequentially shifting the column for blocks of the uppermost layer of first N0 rows and M columns (N0<N and N0<M), and outputs data corresponding to each block of the uppermost layer of the N0 rows and the M columns in compressed image data in an order by which each block is selected, and then repeats an operation for selecting M blocks of the uppermost layer belonging to the same row while sequentially shifting the row for remaining blocks of the uppermost layer of N-N0 rows and M columns, and outputs data corresponding to each block of the uppermost layer of N-N0 rows and M columns in the compressed image data in an order by which each block is selected.

3. A data compressor comprising:

a pixel value/coefficient converter that sequentially performs encoding processes of a plurality of layers on an image to be compressed, wherein, in an encoding process of a lowermost layer, the pixel value/coefficient converter divides the image to be compressed into blocks of a predetermined pixel size and performs Discrete Cosine Transform (DCT) on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block, and wherein, in an encoding process of each upper layer above the lowermost layer, the pixel value/coefficient converter constructs blocks of the upper layer, each block of the upper layer including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer and outputs the DCT coefficients of each block of each layer that have been obtained through the encoding process of each layer; and an output unit that collectively orders the DCT coefficients of blocks of each layer belonging to each block of an uppermost layer and outputs the ordered DCT coefficients as compressed image data, wherein, when a still image is divided into an arrangement of blocks of the uppermost layer, the output unit selects one of blocks of 4 corners in the arrangement of blocks and repeats an operation for selecting each block of an L-shaped block sequence surrounding a range of the selected block, and, after the L-shaped block sequence including a last row or column has been selected, the output unit sequentially selects each block of each remaining row or column and outputs data corresponding to each block of the uppermost layer in the compressed image data in an order by which each block is selected.

4. A data decompressor that performs a decompression process on compressed image data generated by a data compressor, the data compressor including a pixel value/coefficient converter that sequentially performs encoding processes of a plurality of layers on an image to be compressed, the data compressor generating the compressed image data representing DCT coefficients of a block of each layer obtained through the encoding process of each layer, wherein, in an encoding process of a lowermost layer, the pixel value/coefficient converter divides the image to be compressed into blocks of a predetermined pixel size and performs Discrete Cosine Transform (DCT) on each of the blocks to calculate DCT coefficients of the block while performing a correction process on the block by subtracting components of a slope cancellation function of the block from the DCT coefficients of the block to calculate DCT coefficients as corrected for the block of the lowermost layer with reference to DCT coefficients of each adjacent block at top, bottom, left, and right sides of the block, and wherein, in an encoding process of each upper layer above the lowermost layer, the pixel value/coefficient converter constructs blocks of the upper layer, each block of the upper layer including a predetermined number of blocks that have been subjected to an encoding process of a lower layer below the upper layer, and performs DCT on each of the blocks of the upper layer using DCT coefficients of DC component of each block of a lower layer included in the block of the upper layer to calculate DCT coefficients while performing a correction process on the block of the upper layer by subtracting components of a slope cancellation function of the block of the upper layer from the DCT coefficients of the block of the upper layer to calculate DCT coefficients as corrected for the block of the upper layer with reference to DCT coefficients of each adjacent block at top, bottom, left, and right sides of the block of the upper layer, the data decompressor comprising:

a memory having a plurality of areas such that data can be read from or written to the memory in units of areas, each of the areas having a capacity capable of storing a plurality of DCT coefficients or a plurality of pixel values;

a coefficient/pixel value converter that sequentially performs a decoding process of each layer from an uppermost layer to the lowermost layer using DCT coefficients obtained as a result of the encoding process of each layer represented by the compressed image data, and calculates pixel values of an image before the compression, wherein, in the decoding process of each layer other than the lowermost layer, the coefficient/pixel value converter performs a correction process on each block of the layer by adding DCT coefficients of a slope cancellation function of the block to DCT coefficients of the block with reference to DCT coefficients of the layer of adjacent blocks at top, bottom, left, and right sides of the block previously stored in the memory, and performs inverse DCT on the DCT coefficients of the block that has been subjected to the correction process to calculate DCT coefficients of DC component of each of a plurality of blocks of a lower layer below the layer into which the block of the layer has been divided and writes the DCT coefficients of DC component of the block of the lower layer to the memory, wherein, in the decoding process of the lowermost layer, the coefficient/pixel value converter performs a correction process on each block of the lowermost layer by adding DCT coefficients of a slope cancellation function of the block to the DCT coefficients of the block with reference to DCT coefficients of the lowermost layer of adjacent blocks at top, bottom, left, and right sides of the block previously stored in the memory, and performs inverse DCT on the DCT coefficients of the block that has been subjected to the correction process to calculate pixel values of the block of the lowermost layer and writes the pixel values of the block of the lowermost layer to the memory, wherein the compressed image data includes DCT coefficients of blocks of each layer belonging to each block of an uppermost layer, and wherein the data decompressor further comprises a reordering unit that reorders DCT coefficients of a block of the uppermost layer and blocks of each layer belonging to the block of the uppermost layer extracted from the compressed image data so that DCT coefficients of each layer are arranged in order of the layer and DCT coefficients to be stored in the same area are sequentially arranged, the reordering unit being located upstream of the coefficient/pixel value converter, and collectively stores DCT coefficients of each layer on a layer by layer basis in each area of the memory.

* * * * *